United States Patent
Shah et al.

(10) Patent No.: US 11,436,696 B2
(45) Date of Patent: *Sep. 6, 2022

(54) APPARATUS AND METHOD FOR PROVISIONING VIRTUALIZED MULTI-TILE GRAPHICS PROCESSING HARDWARE

(71) Applicant: Intel Corporation, Santa Clara, CA (US)

(72) Inventors: Ankur N. Shah, Folsom, CA (US); Nishanth Reddy Pendluru, Folsom, CA (US); Joseph Koston, Folsom, CA (US); Murali Ramadoss, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/362,230

(22) Filed: Jun. 29, 2021

(65) Prior Publication Data

US 2021/0398243 A1     Dec. 23, 2021

Related U.S. Application Data

(63) Continuation of application No. 16/457,029, filed on Jun. 28, 2019, now Pat. No. 11,055,809.

(51) Int. Cl.
*G06F 15/00* (2006.01)
*G06T 1/20* (2006.01)
(Continued)

(52) U.S. Cl.
CPC .............. *G06T 1/20* (2013.01); *G06F 9/3836* (2013.01); *G06F 9/45558* (2013.01);
(Continued)

(58) Field of Classification Search
CPC ............. G06F 9/45558; G06F 9/45533; G06F 9/4881; G06F 9/5077; G06F 2009/4557;
(Continued)

(56) References Cited

U.S. PATENT DOCUMENTS

2015/0371354 A1   12/2015   Petersen et al.
2016/0328333 A1   11/2016   Dong et al.
(Continued)

OTHER PUBLICATIONS

Final Office Action, U.S. Appl. No. 16/457,029, dated Nov. 13, 2020, 11 pages.
(Continued)

*Primary Examiner* — Hau H Nguyen
(74) *Attorney, Agent, or Firm* — Nicholson De Vos Webster & Elliott LLP

(57) ABSTRACT

An apparatus and method for provisioning virtualized tile-based graphics processing circuitry. For example, one embodiment of an apparatus comprises: processing resources to process commands including graphics commands and generate results; resource partitioning circuitry to partition the processing resources into a plurality of tiles in accordance with a specified tile-based resource allocation policy; and graphics virtualization circuitry to perform tile-based allocation of the processing resources to a plurality of virtual machines in accordance with a specified virtualization policy, the virtual machines to be executed in a virtualized execution environment.

24 Claims, 32 Drawing Sheets

(51) Int. Cl.
 *G06T 15/00* (2011.01)
 *G06F 9/455* (2018.01)
 *G06F 9/38* (2018.01)
 *G06F 9/50* (2006.01)

(52) U.S. Cl.
 CPC .......... *G06F 9/5061* (2013.01); *G06T 15/005* (2013.01); *G06F 2009/45583* (2013.01); *G06F 2009/45595* (2013.01)

(58) Field of Classification Search
 CPC ................ G06F 12/109; G06F 9/5011; G06F 2212/151; G06F 9/50; G06F 2212/1041; G06F 2212/152; G09G 2360/122
 See application file for complete search history.

(56) References Cited

U.S. PATENT DOCUMENTS

2018/0027062 A1* 1/2018 Bernat .................. G06F 3/0665
 709/224
2018/0081429 A1 3/2018 Akenine-Moller et al.

OTHER PUBLICATIONS

Non-Final Office Action, U.S. Appl. No. 16/457,029, dated Jul. 2, 2020, 11 pages.
Notice of Allowance, U.S. Appl. No. 16/457,029, dated Mar. 5, 2021, 8 pages.

* cited by examiner

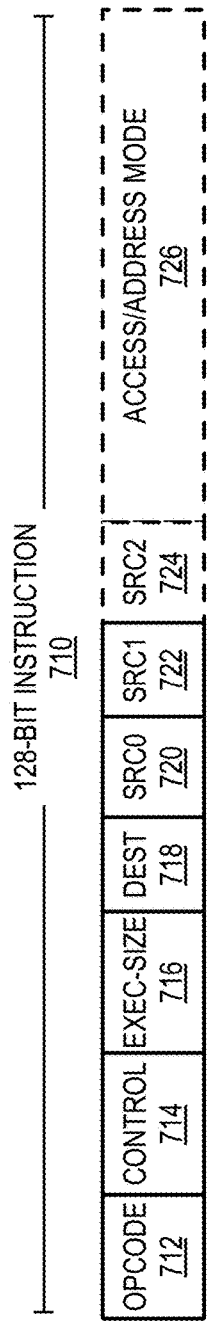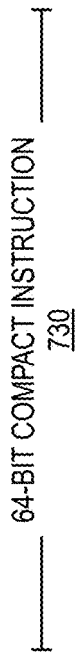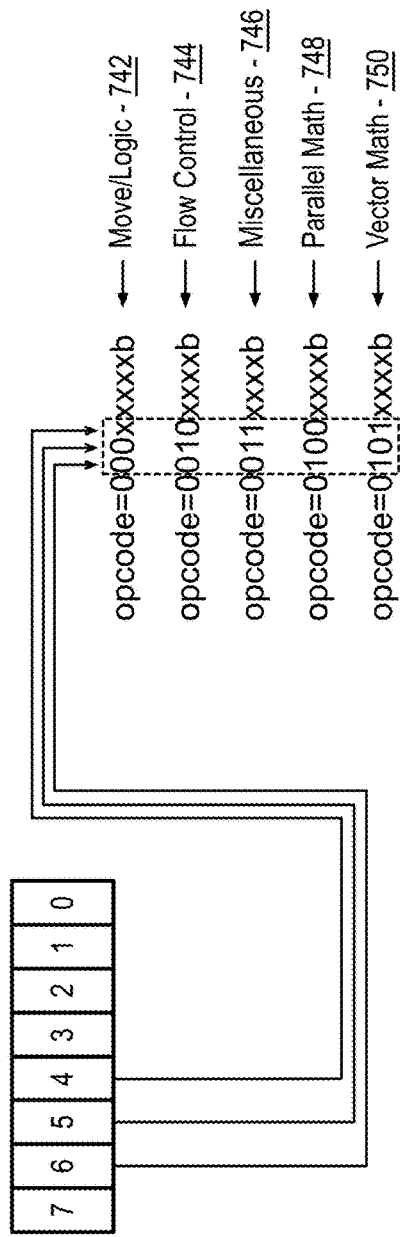
FIG. 7

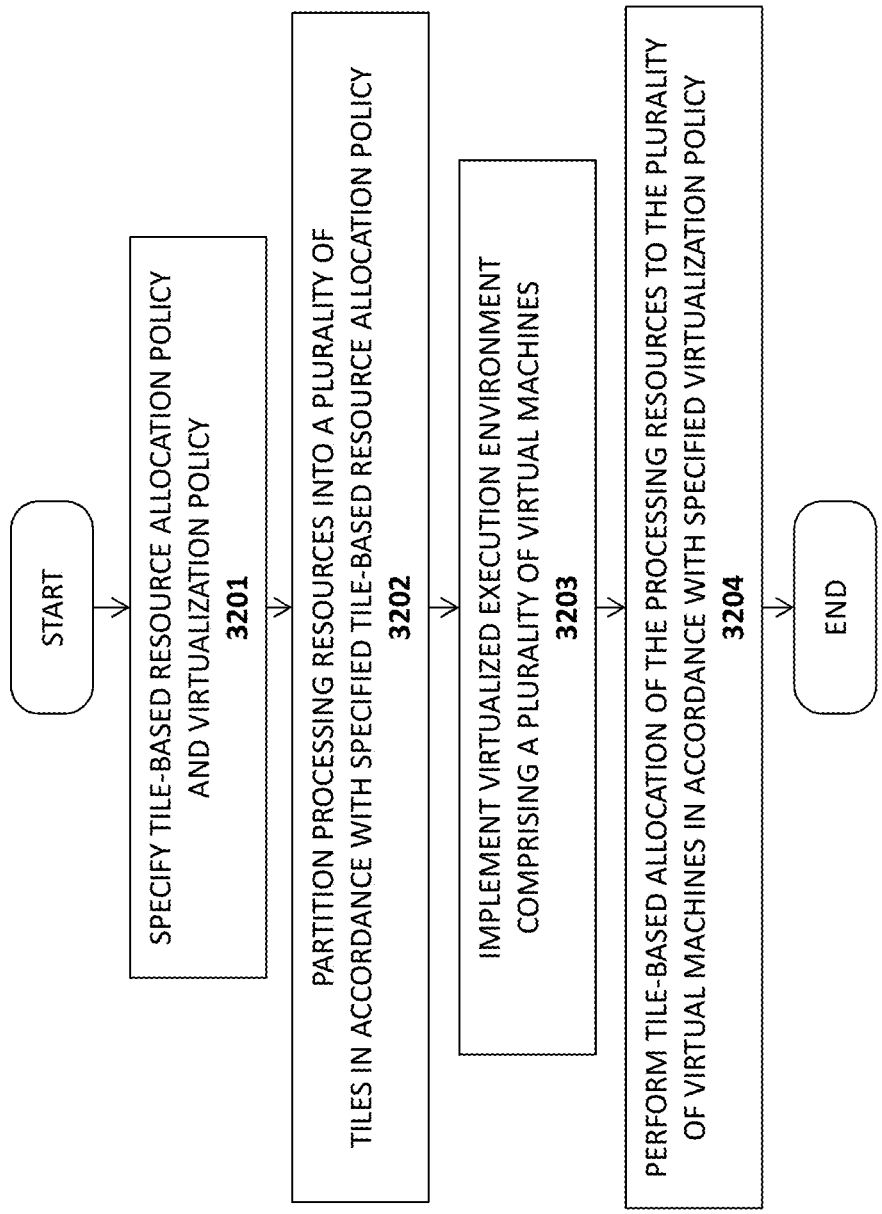

APPARATUS AND METHOD FOR PROVISIONING VIRTUALIZED MULTI-TILE GRAPHICS PROCESSING HARDWARE

BACKGROUND

Field of the Invention

This invention relates generally to the field of graphics processors. More particularly, the invention relates to an apparatus and method for provisioning virtualized multi-tile graphics processing hardware.

Description of the Related Art

Rapid advances have recently taken place in graphics processor unit (GPU) virtualization. Virtualized graphics processing environments are used, for example, in the media cloud, remote workstations/desktops, Interchangeable Virtual Instrumentation (IVI), rich client virtualization, to name a few. Certain architectures perform full GPU virtualization through trap-and-emulation to emulate a full-featured virtual GPU (vGPU) while still providing near-to-native performance by passing through performance-critical graphics memory resources.

With the increasing importance of GPUs in servers to support 3D, media and GPGPU workloads, GPU virtualization is becoming more widespread. How to virtualize GPU memory access from a virtual machine (VM) is one of the key design factors. The GPU has its own graphics memory: either dedicated video memory or shared system memory. When system memory is used for graphics, guest physical addresses (GPAs) need to be translated to host physical addresses (HPAs) before being accessed by hardware.

There are various approaches for performing translation for GPUs. Some implementations perform translation with hardware support, but the GPU can be passed-through to one VM only. Another solution is a software approach which constructs shadow structures for the translation. For instance, shadow page tables are implemented in some architectures such as the full GPU virtualization solution mentioned above, which can support multiple VMs to share a physical GPU.

In some implementations, the guest/VM memory pages are backed by host memory pages. A virtual machine monitor (VMM) (sometimes called a "Hypervisor") uses extended page tables (EPT), for example, to map from a guest physical address (PA) to a host PA. Many memory sharing technologies may be used, such as Kernel Same page Merging (KSM).

KSM combines pages from multiple VMs with the same content, to a single page with write protection. That is to say, if a memory page in VM1 (mapping from guest PA1 to host PA1), has the same contents as another memory page in VM2 (mapping from guest PA2 to host PA2), may use only one host page (say HPA SH) to back the guest memory. That is, both guest PA1 of VM1 and PA2 of VM2 are mapped to HPA SH with write protection. This saves the memory used for the system, and is particularly useful for read-only memory pages of the guest such as code pages, and zero pages. With KSM, copy-on-write (COW) technology is used to remove the sharing once a VM modifies the page content.

Mediate pass through is used in virtualization systems for device performance and sharing, where a single physical GPU is presented as multiple virtual GPU to multiple guests with direct DMA, while the privileges resource accesses from guests are still trap-and-emulated. In some implementations, each guest can run the native GPU driver, and device DMA goes directly to memory without hypervisor intervention.

System administrators attempt to optimally utilize the processing resources of each GPU and scale/sell these resources based on tenant needs. For example, in a single server installation with a single GPU card, system administrators configure GPU resources and partition them such that they can meet only entry/mid/high-end level GPUs needed for each virtual machine. Each partition needs to meet the quality of service, isolation, and guaranteed latency requirements for each assigned workload.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 32 illustrates a method in accordance with one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
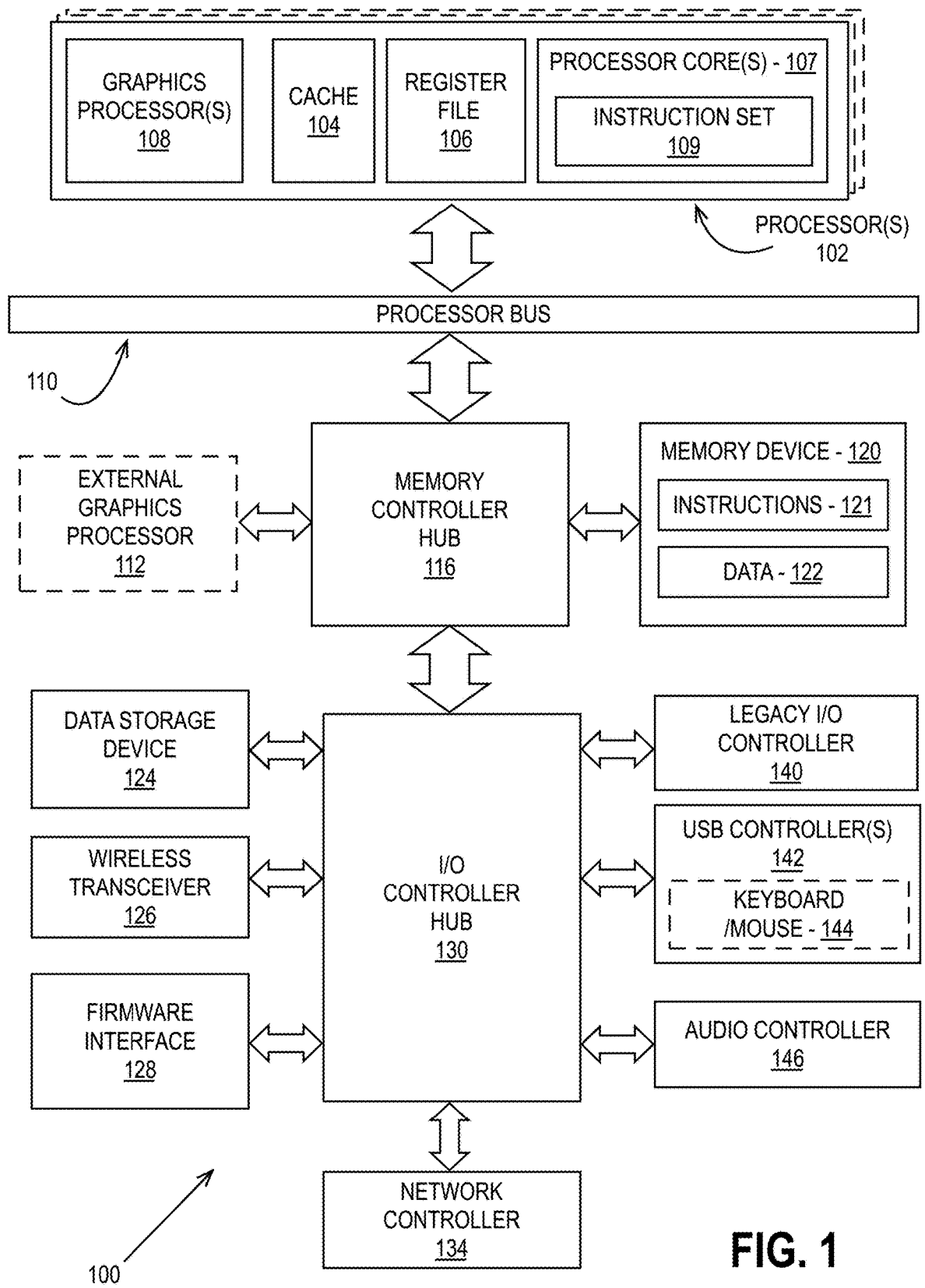
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled with a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple with ICH 130. In some embodiments, a high-performance network controller (not shown) couples with processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
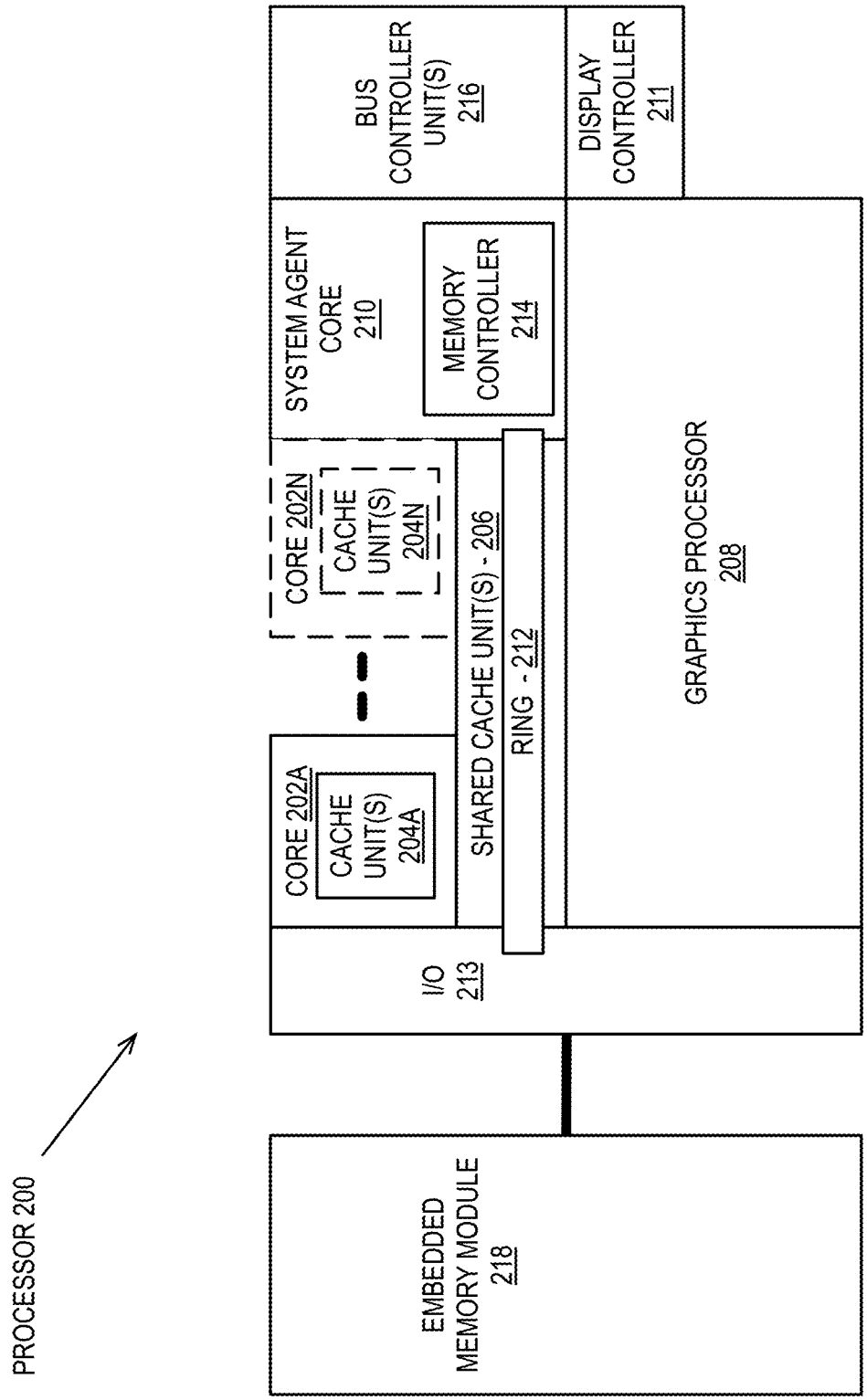
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
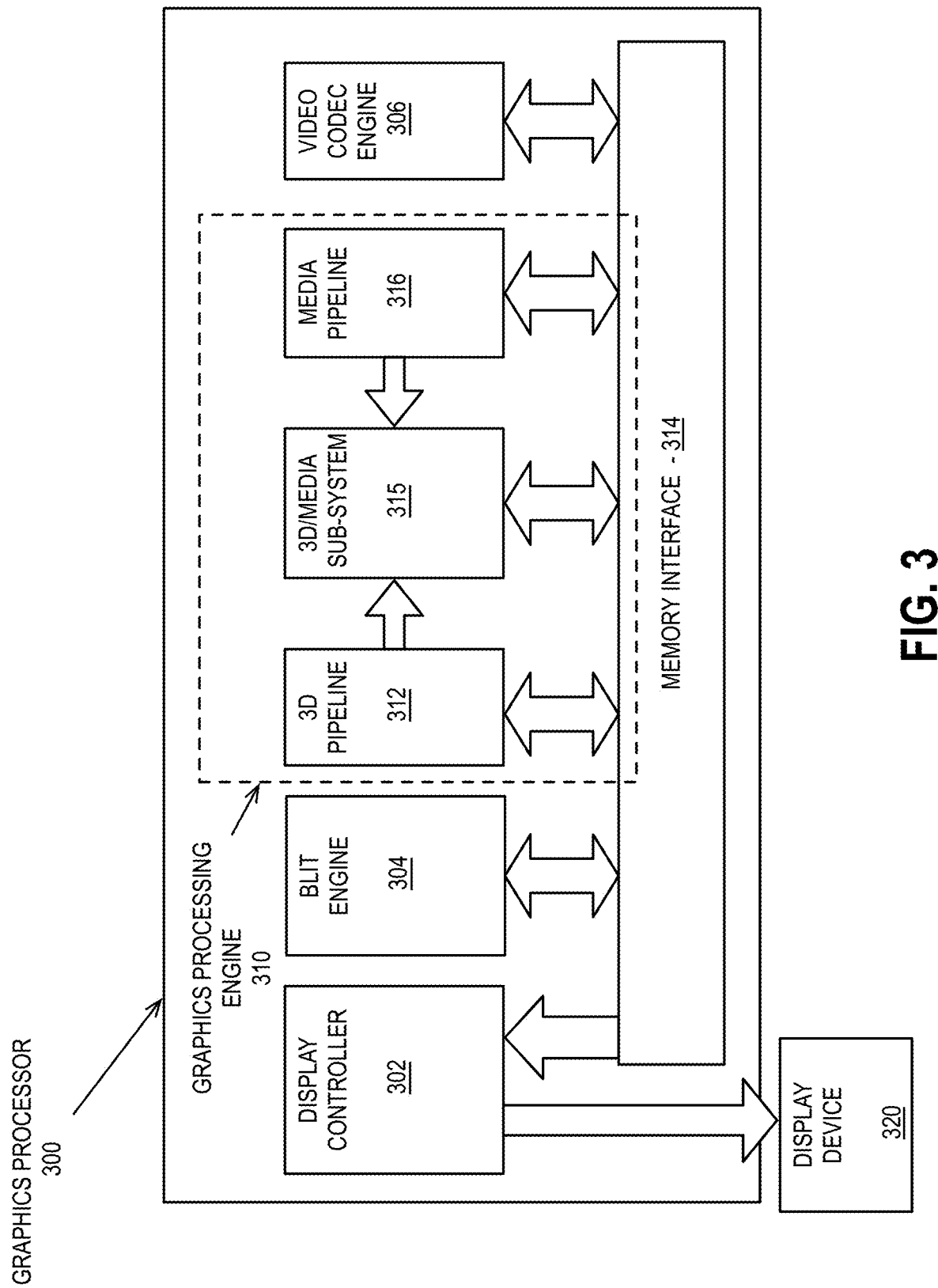
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
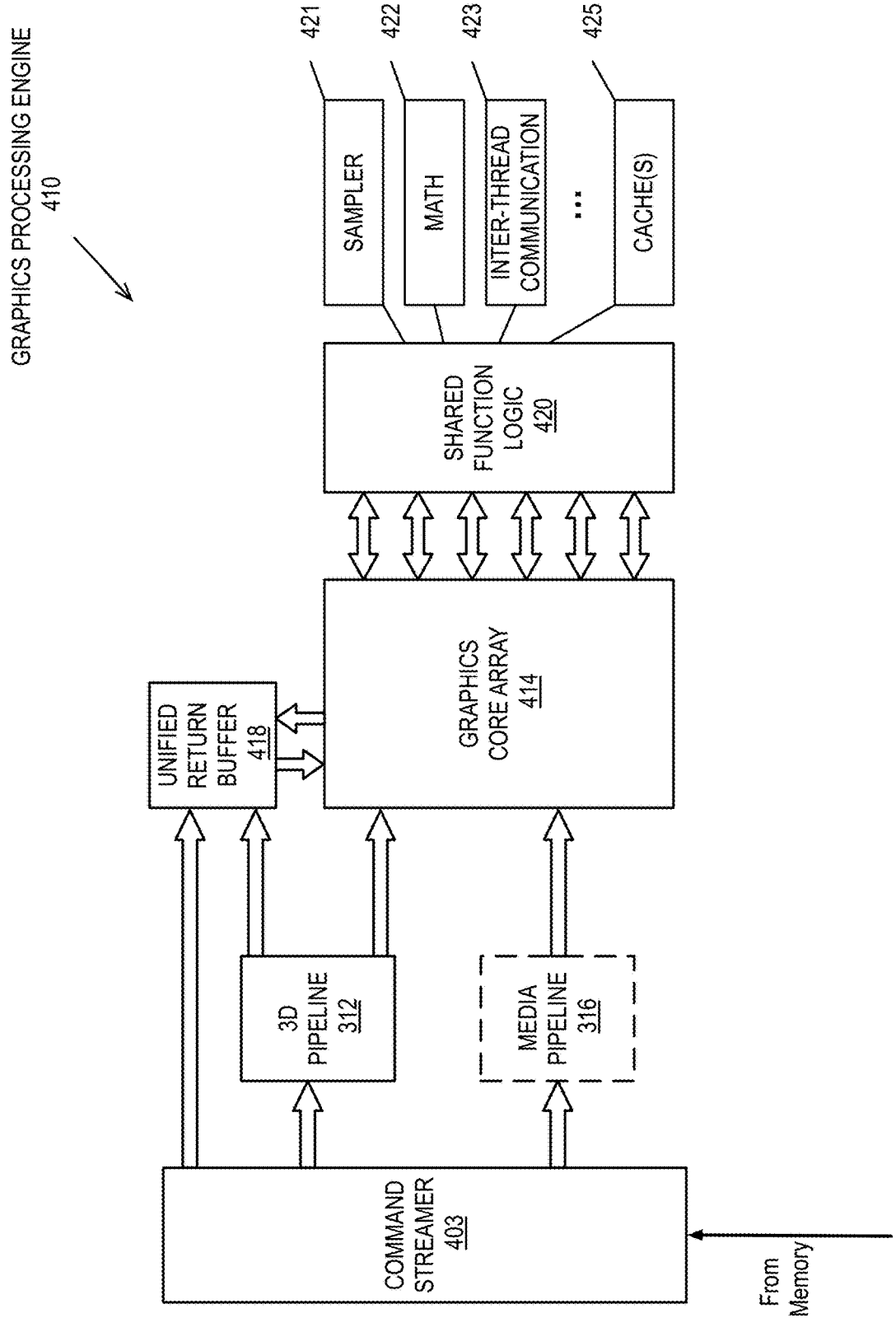
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414.

In various embodiments the 3D pipeline 312 can execute one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources. Multi-purpose execution logic (e.g., execution units) within the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general purpose computational operations, in addition to graphics processing operations. The general purpose logic can perform processing operations in parallel or in conjunction with general purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420. A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies between embodiments.

Figure 5:
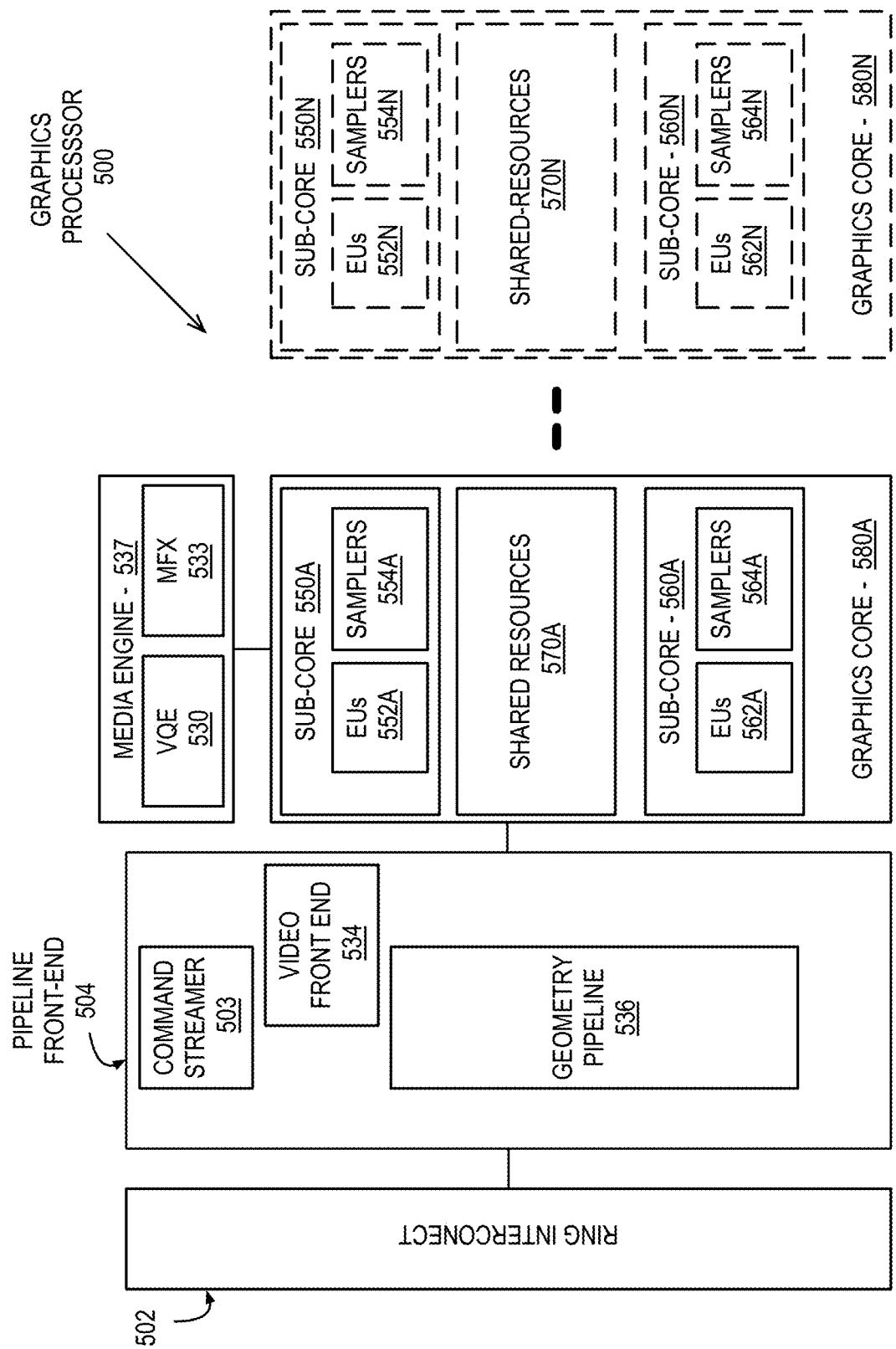
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Execution Units

Figure 6:
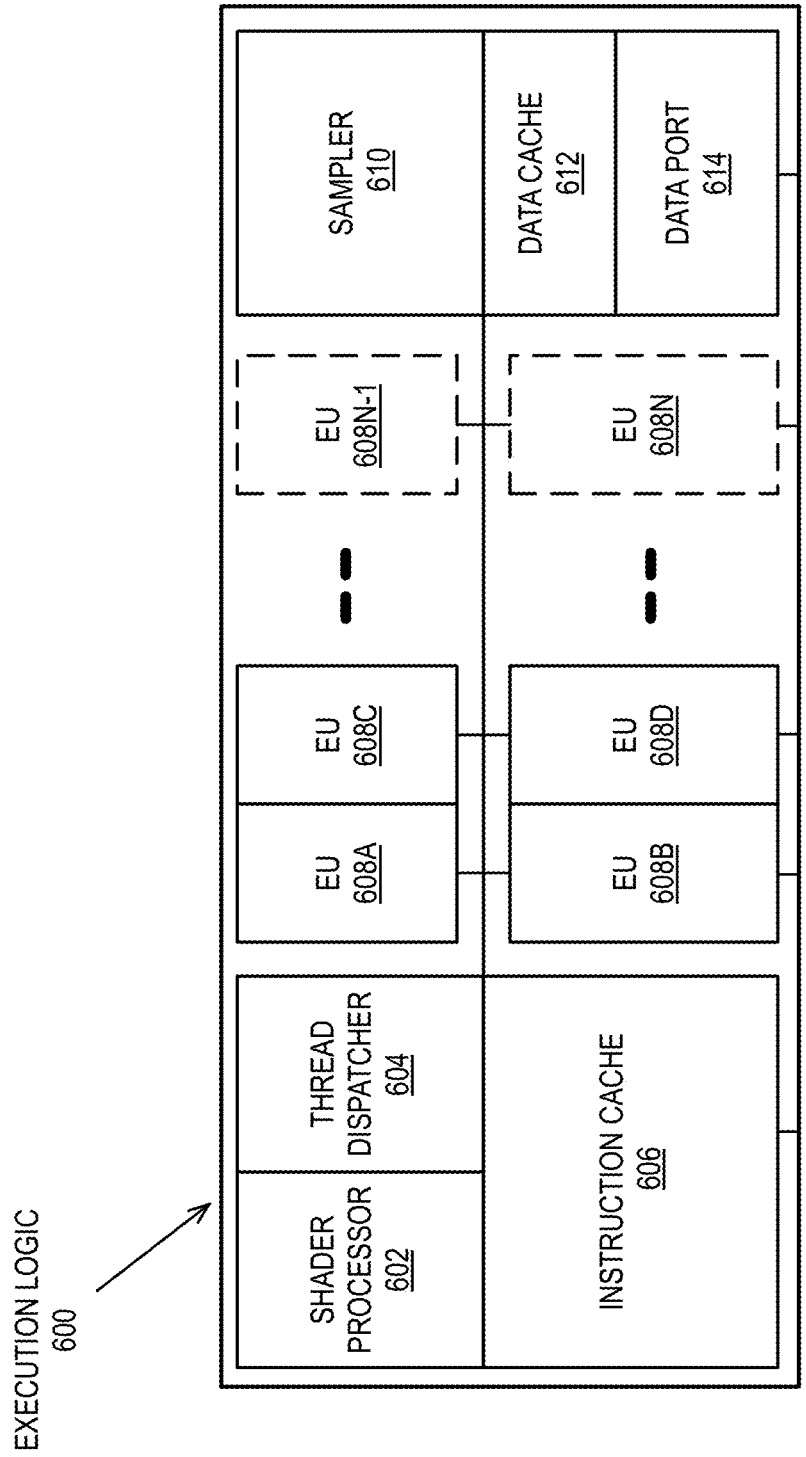
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, the geometry pipeline (e.g., 536 of FIG. 5) can dispatch vertex, tessellation, or geometry shaders to the thread execution logic 600 (FIG. 6) for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
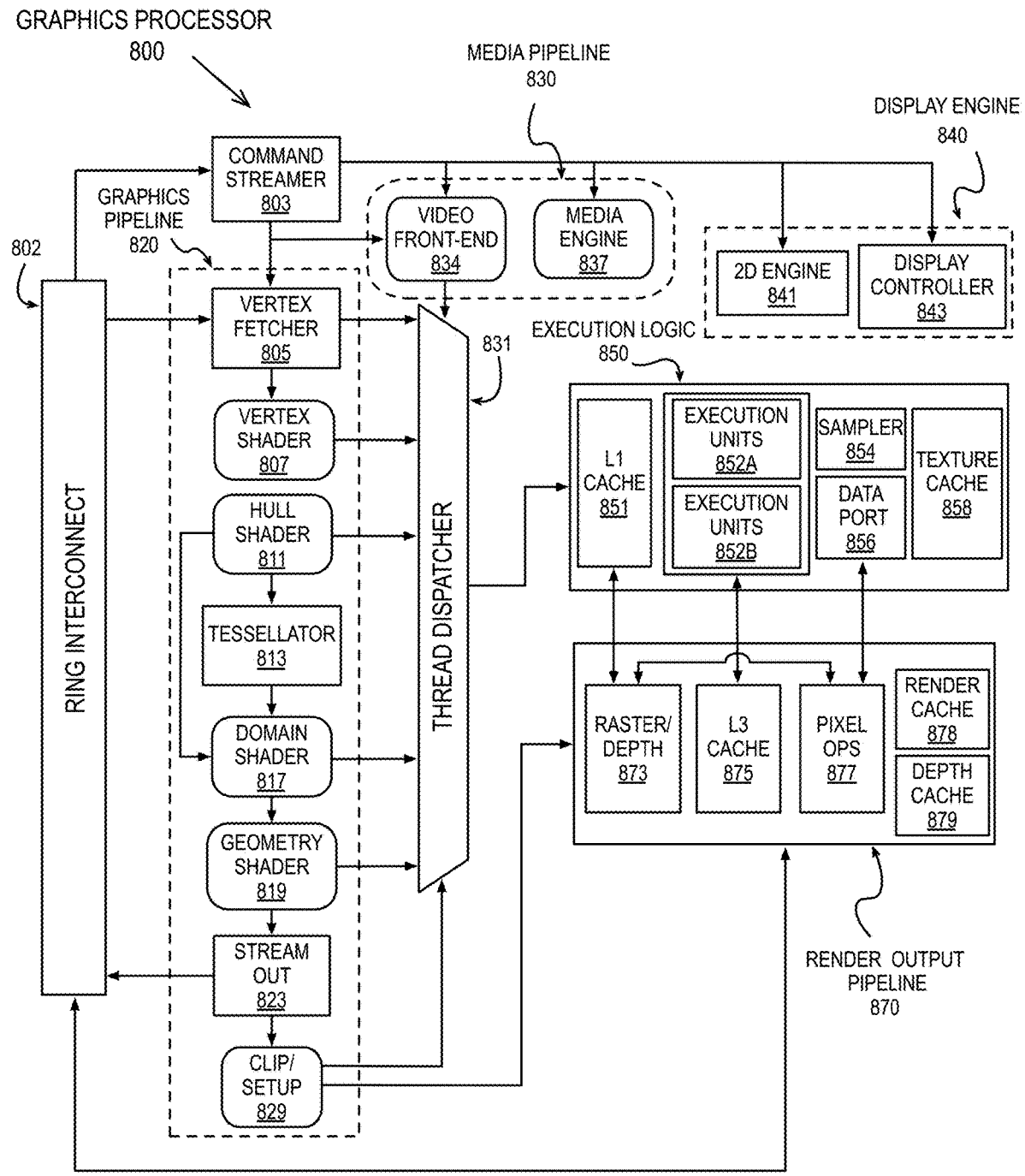
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A-852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
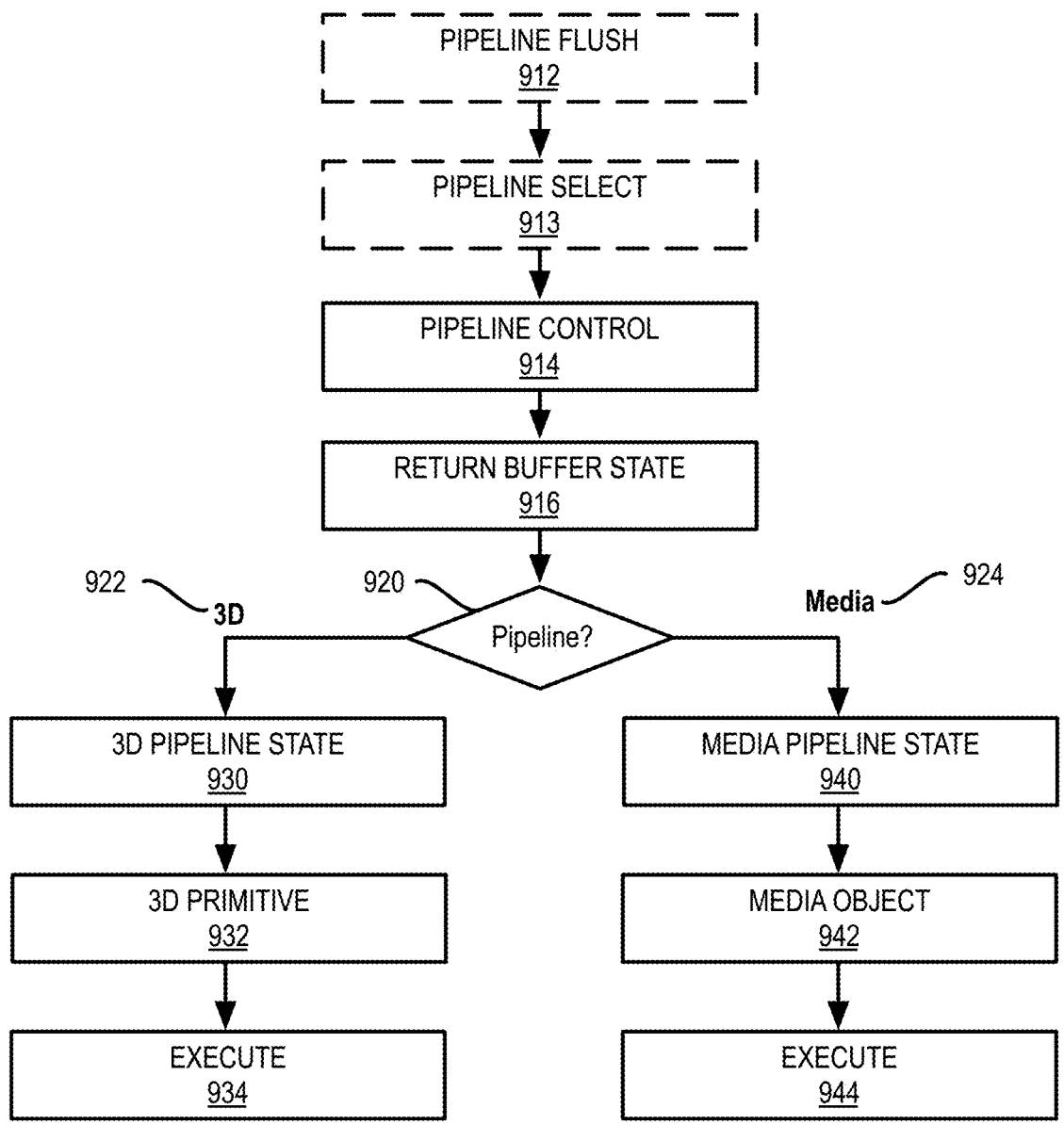
FIG. 9A is a block diagram illustrating a graphics processor command format according to an embodiment.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
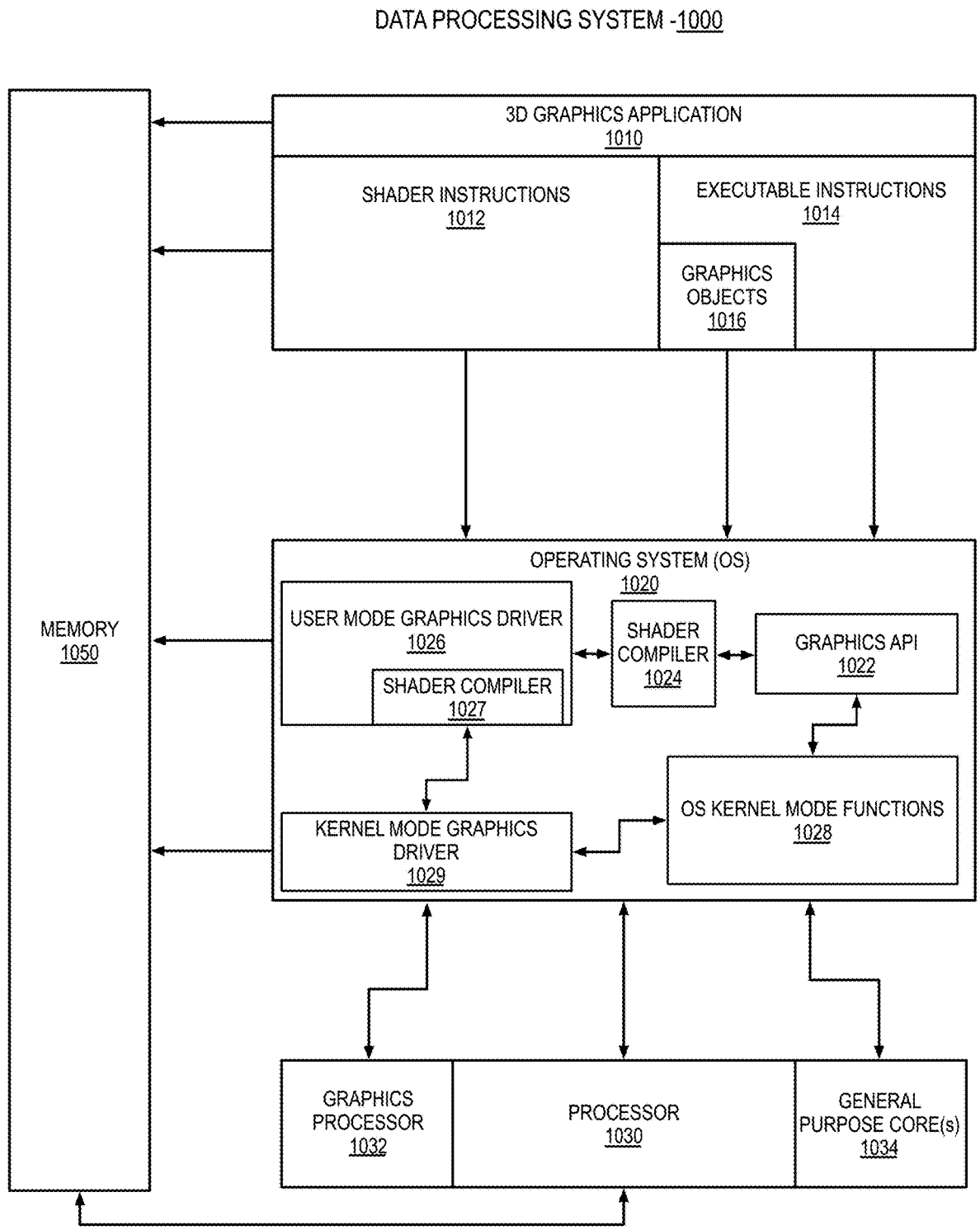
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
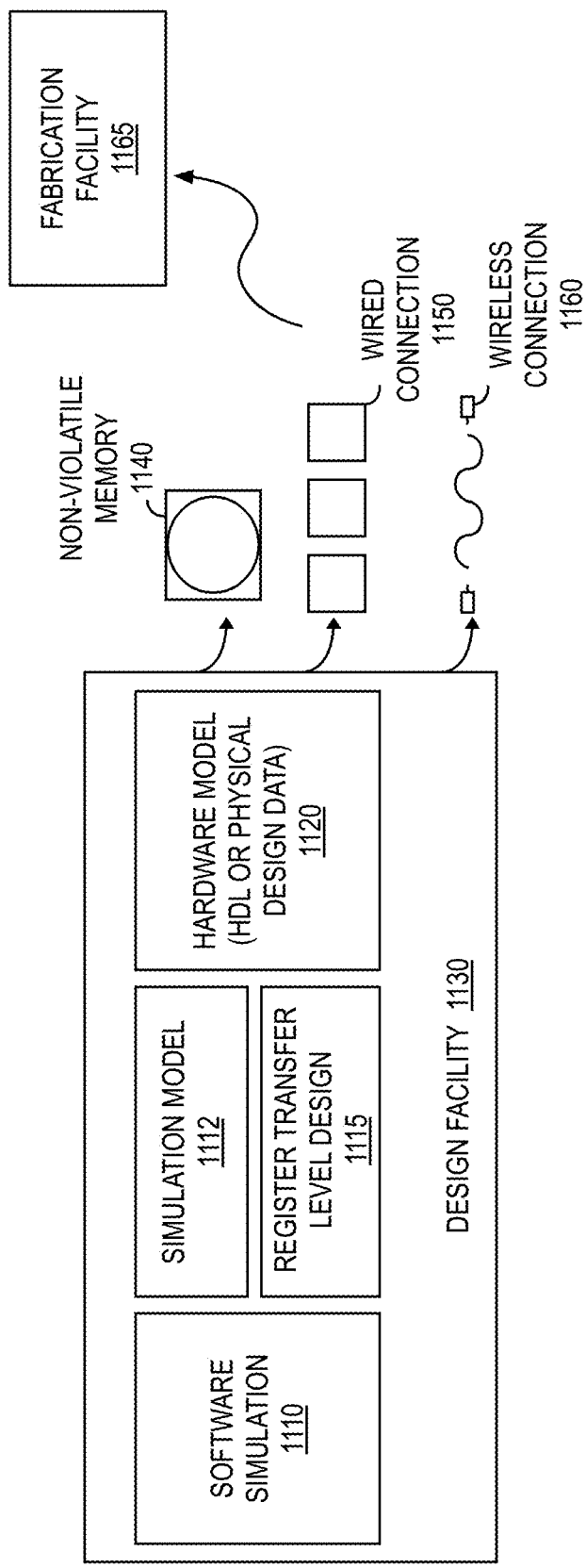
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
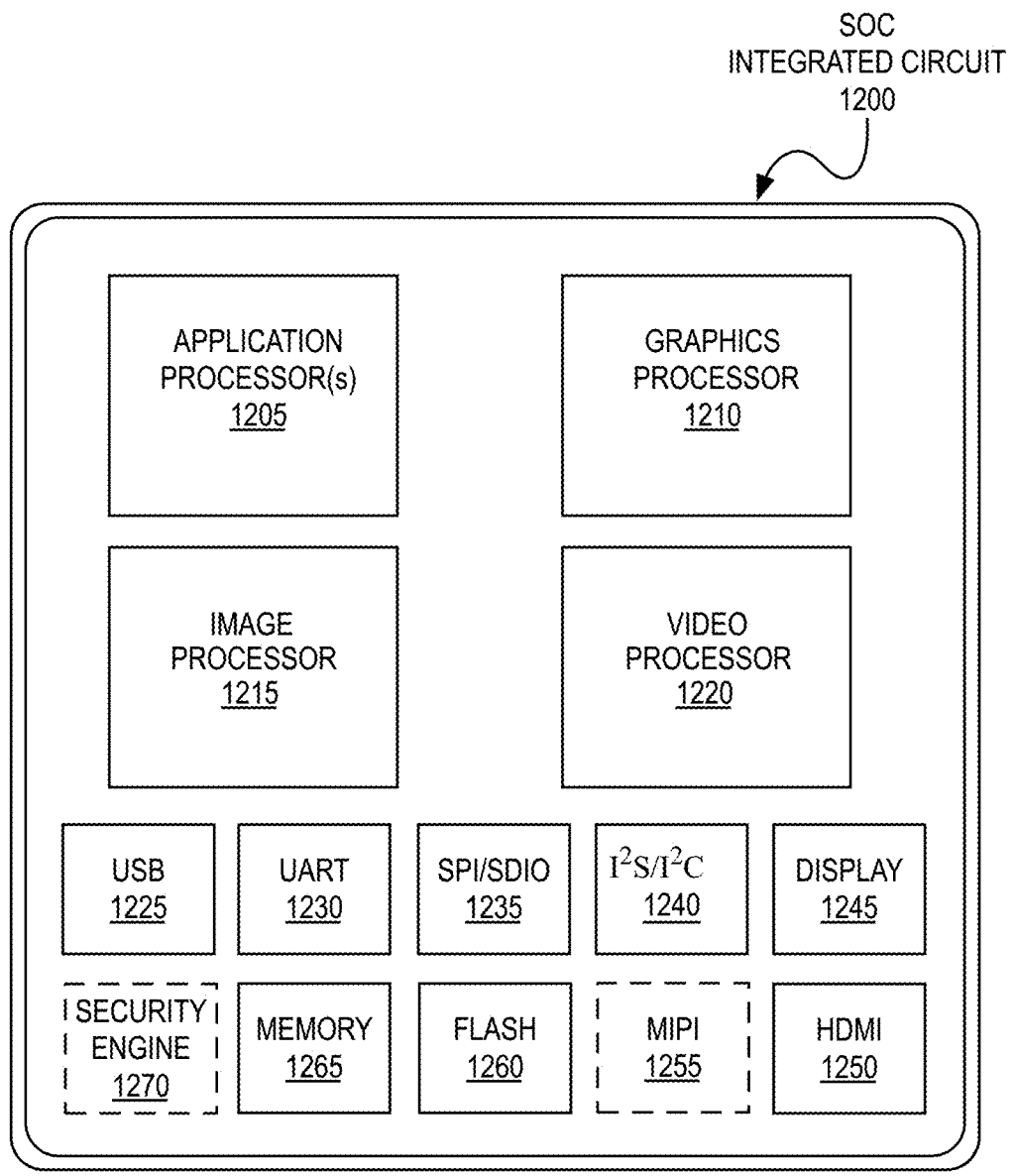
FIG. 12 illustrates an exemplary system on a chip integrated circuit that may be fabricated using one or more IP cores, according to an embodiment.
Figure 13:
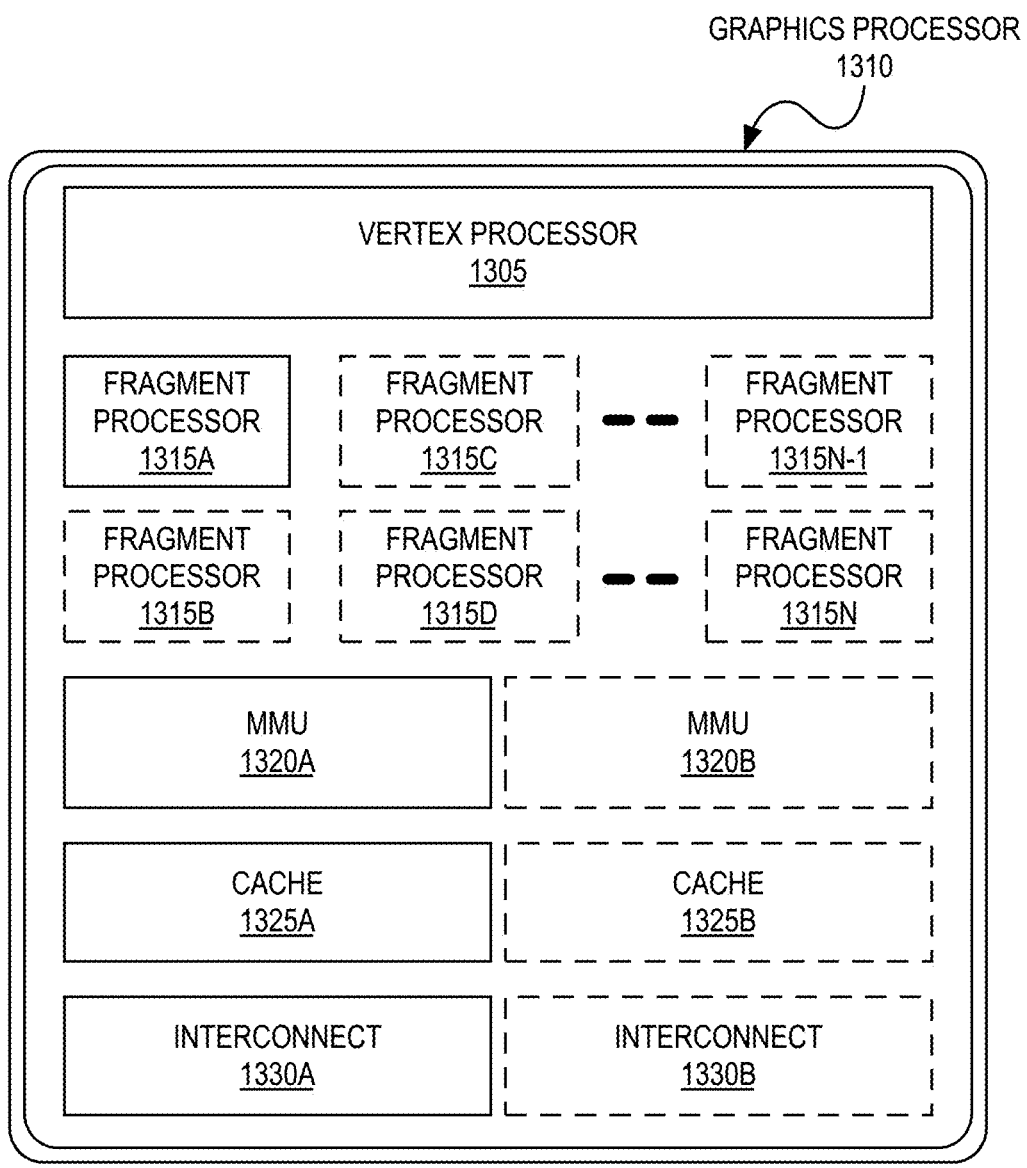
FIG. 13 illustrates an exemplary graphics processor of a system on a chip integrated circuit that may be fabricated using one or more IP cores.
Figure 14:
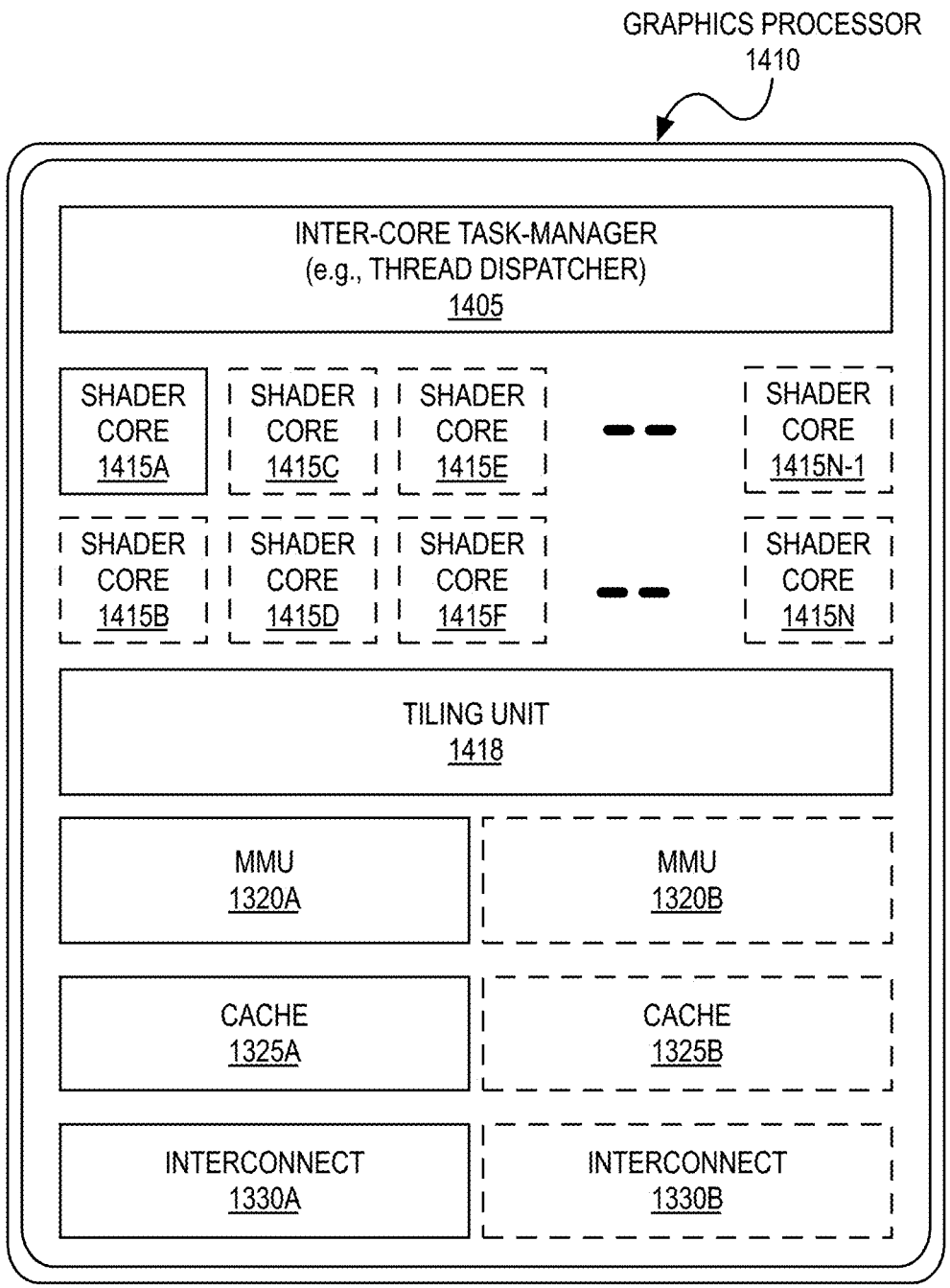
FIG. 14 illustrates an additional exemplary graphics processor of a system on a chip integrated circuit that may be fabricated using one or more IP cores.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I2S/I2C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A 1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N and a tiling unit 1418 to accelerate tiling operations for tile-based rendering, in which rendering operations for a scene are subdivided in image space, for example to exploit local spatial coherence within a scene or to optimize use of internal caches.

Exemplary Graphics Virtualization Architectures

Some embodiments of the invention are implemented on a platform utilizing full graphics processor unit (GPU) virtualization. As such, an overview of the GPU virtualization techniques employed in one embodiment of the invention is provided below, followed by a detailed description of an apparatus and method for pattern-driven page table shadowing.

One embodiment of the invention employs a full GPU virtualization environment running a native graphics driver in the guest, and mediated pass-through that achieves both good performance, scalability, and secure isolation among guests. This embodiment presents a virtual full-fledged GPU to each virtual machine (VM) which can directly access performance-critical resources without intervention from the hypervisor in most cases, while privileged operations from the guest are trap-and-emulated at minimal cost. In one embodiment, a virtual GPU (vGPU), with full GPU features, is presented to each VM. VMs can directly access performance-critical resources, without intervention from the hypervisor in most cases, while privileged operations from the guest are trap-and-emulated to provide secure isolation among VMs. The vGPU context is switched per quantum, to share the physical GPU among multiple VMs.

Figure 15:
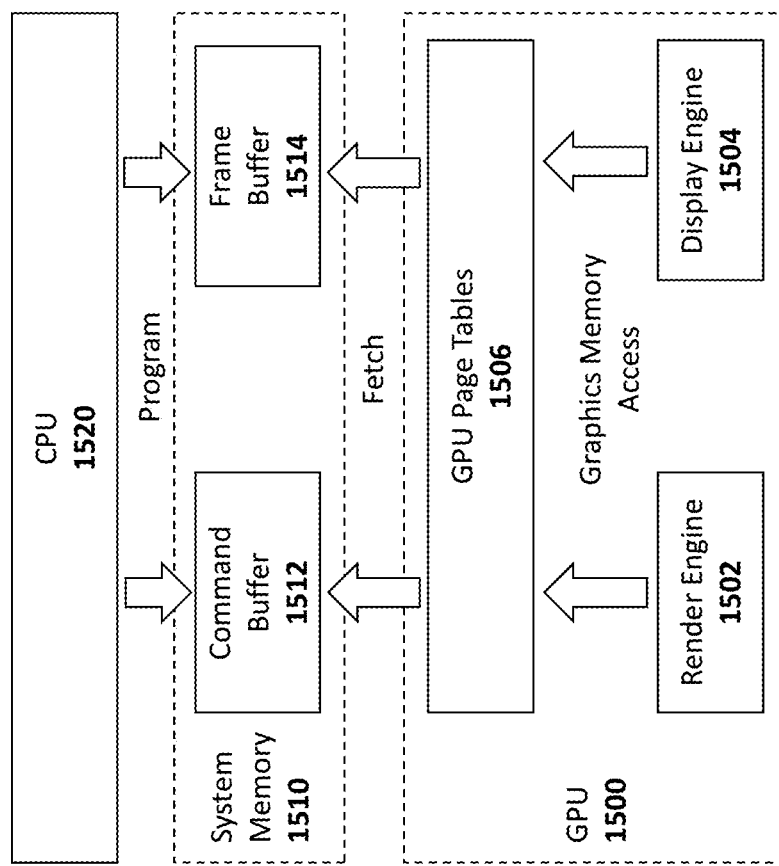
FIG. 15 illustrates an exemplary graphics processing system.

FIG. 15 illustrates a high level system architecture on which embodiments of the invention may be implemented which includes a graphics processing unit (GPU) 1500, a central processing unit (CPU) 1520, and a system memory 1510 shared between the GPU 1500 and the CPU 1520. A render engine 1502 fetches GPU commands from a command buffer 1512 in system memory 1510, to accelerate graphics rendering using various different features. The display engine 1504 fetches pixel data from the frame buffer 1514 and then sends the pixel data to external monitors for display.

Certain architectures use system memory 1510 as graphics memory, while other GPUs may use on-die memory. System memory 1510 may be mapped into multiple virtual address spaces by GPU page tables 1506. A 2 GB global virtual address space, called global graphics memory, accessible from both the GPU 1500 and CPU 1520, is mapped through global page tables. Local graphics memory spaces are supported in the form of multiple 2 GB local virtual address spaces, but are only limited to access from the render engine 1502, through local page tables. Global graphics memory is mostly the frame buffer 1514, but also serves as the command buffer 1512. Large data accesses are made to local graphics memory when hardware acceleration is in progress. Similar page table mechanisms are employed by GPUs with on-die memory.

In one embodiment, the CPU 1520 programs the GPU 1500 through GPU-specific commands, shown in FIG. 15, in a producer-consumer model. The graphics driver programs GPU commands into the command buffer 1512, including a primary buffer and a batch buffer, according to high level programming APIs like OpenGL and DirectX. The GPU 1500 then fetches and executes the commands. The primary buffer, a ring buffer, may chain other batch buffers together. The terms "primary buffer" and "ring buffer" are used interchangeably hereafter. The batch buffer is used to convey the majority of the commands (up to ~98%) per programming model. A register tuple (head, tail) is used to control the ring buffer. In one embodiment, the CPU 1520 submits the commands to the GPU 1500 by updating the tail, while the GPU 1500 fetches commands from head, and then notifies the CPU 1520 by updating the head, after the commands have finished execution.

As mentioned, one embodiment of the invention is implemented in a full GPU virtualization platform with mediated pass-through. As such, every VM is presented with a full-fledged GPU to run a native graphics driver inside a VM. The challenge, however, is significant in three ways: (1) complexity in virtualizing an entire sophisticated modern GPU, (2) performance due to multiple VMs sharing the GPU, and (3) secure isolation among the VMs without any compromise.

Figure 16:
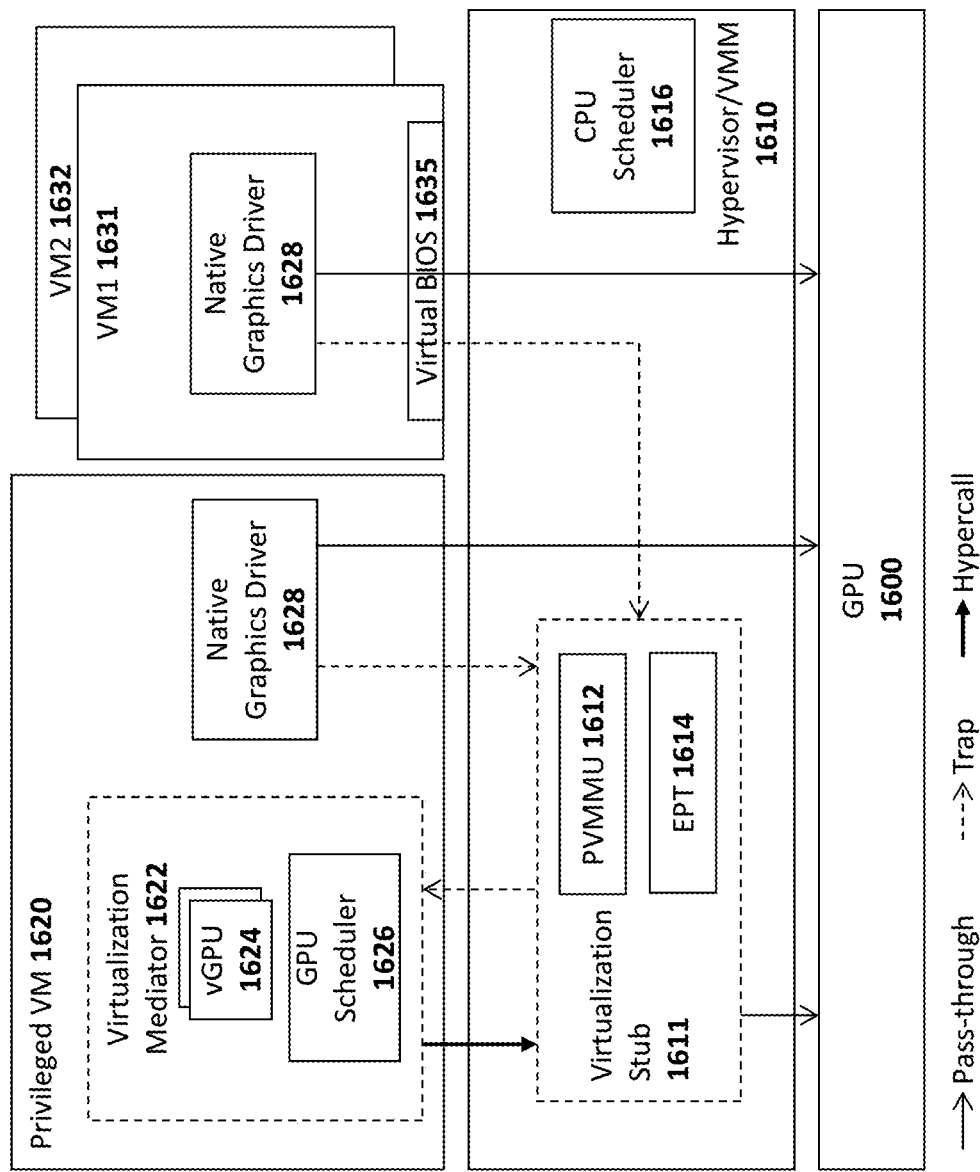
FIG. 16 illustrates an exemplary architecture for full graphics virtualization.

FIG. 16 illustrates a GPU virtualization architecture in accordance with one embodiment of the invention which includes a hypervisor 1610 running on a GPU 1600, a privileged virtual machine (VM) 1620 and one or more user VMs 1631-1632. A virtualization stub module 1611 running in the hypervisor 1610 extends memory management to include extended page tables (EPT) 1614 for the user VMs 1631-1632 and a privileged virtual memory management unit (PVMMU) 1612 for the privileged VM 1620, to implement the policies of trap and pass-through. In one embodiment, each VM 1620, 1631-1632 runs the native graphics driver 1628 which can directly access the performance-critical resources of the frame buffer and the command buffer, with resource partitioning as described below. To protect privileged resources, that is, the I/O registers and PTEs, corresponding accesses from the graphics drivers 1628 in user VMs 1631-1632 and the privileged VM 1620, are trapped and forwarded to the virtualization mediator 1622 in the privileged VM 1620 for emulation. In one embodiment, the virtualization mediator 1622 uses hypercalls to access the physical GPU 1600 as illustrated.

In addition, in one embodiment, the virtualization mediator 1622 implements a GPU scheduler 1626, which runs concurrently with the CPU scheduler 1616 in the hypervisor 1610, to share the physical GPU 1600 among the VMs 1631-1632. One embodiment uses the physical GPU 1600 to directly execute all the commands submitted from a VM, so it avoids the complexity of emulating the render engine, which is the most complex part within the GPU. In the meantime, the resource pass-through of both the frame buffer and command buffer minimizes the hypervisor's 1610 intervention on CPU accesses, while the GPU scheduler 1626 guarantees every VM a quantum for direct GPU execution. Consequently, the illustrated embodiment achieves good performance when sharing the GPU among multiple VMs.

In one embodiment, the virtualization stub 1611 selectively traps or passes-through guest access of certain GPU resources. The virtualization stub 1611 manipulates the EPT 1614 entries to selectively present or hide a specific address range to user VMs 1631-1632, while uses a reserved bit of PTEs in the PVMMU 1612 for the privileged VM 1620, to selectively trap or pass-through guest accesses to a specific address range. In both cases, the peripheral input/output (PIO) accesses are trapped. All the trapped accesses are forwarded to the virtualization mediator 1622 for emulation while the virtualization mediator 1611 uses hypercalls to access the physical GPU 1600.

As mentioned, in one embodiment, the virtualization mediator 1622 emulates virtual GPUs (vGPUs) 1624 for privileged resource accesses, and conducts context switches amongst the vGPUs 1624. In the meantime, the privileged VM 1620 graphics driver 1628 is used to initialize the physical device and to manage power. One embodiment takes a flexible release model, by implementing the virtualization mediator 1622 as a kernel module in the privileged VM 1620, to ease the binding between the virtualization mediator 1622 and the hypervisor 1610.

A split CPU/GPU scheduling mechanism is implemented via the CPU scheduler 1616 and GPU scheduler 1626. This is done because of the cost of a GPU context switch may be over 1000 times the cost of a CPU context switch (e.g., ~700 us vs. ~300 ns). In addition, the number of the CPU cores likely differs from the number of the GPU cores in a computer system. Consequently, in one embodiment, a GPU scheduler 1626 is implemented separately from the existing CPU scheduler 1616. The split scheduling mechanism leads to the requirement of concurrent accesses to the resources from both the CPU and the GPU. For example, while the CPU is accessing the graphics memory of VM1 1631, the GPU may be accessing the graphics memory of VM2 1632, concurrently.

As discussed above, in one embodiment, a native graphics driver 1628 is executed inside each VM 1620, 1631-1632, which directly accesses a portion of the performance-critical resources, with privileged operations emulated by the virtualization mediator 1622. The split scheduling mechanism leads to the resource partitioning design described below. To support resource partitioning better, one embodiment reserves a Memory-Mapped I/O (MMIO) register window to convey the resource partitioning information to the VM.

In one embodiment, the location and definition of virt_info has been pushed to the hardware specification as a virtualization extension so the graphics driver 1628 handles the extension natively, and future GPU generations follow the specification for backward compatibility.

While illustrated as a separate component in FIG. 16, in one embodiment, the privileged VM 1620 including the virtualization mediator 1622 (and its vGPU instances 1624 and GPU scheduler 1626) is implemented as a module within the hypervisor 1610.

In one embodiment, the virtualization mediator 1622 manages vGPUs 1624 of all VMs, by trap-and-emulating the privileged operations. The virtualization mediator 1622 handles the physical GPU interrupts, and may generate virtual interrupts to the designated VMs 1631-1632. For example, a physical completion interrupt of command execution may trigger a virtual completion interrupt, delivered to the rendering owner. The idea of emulating a vGPU instance per semantics is simple; however, the implementation involves a large engineering effort and a deep understanding of the GPU 1600. For example, approximately 700 I/O registers may be accessed by certain graphics drivers.

In one embodiment, the GPU scheduler 1626 implements a coarse-grain quality of service (QoS) policy. A particular time quantum may be selected as a time slice for each VM 1631-1632 to share the GPU 1600 resources. For example, in one embodiment, a time quantum of 16 ms is selected as the scheduling time slice, because this value results in a low human perceptibility to image changes. Such a relatively large quantum is also selected because the cost of the GPU context switch is over 1000× that of the CPU context switch, so it can't be as small as the time slice in the CPU scheduler 1616. The commands from a VM 1631-1632 are submitted to the GPU 1600 continuously, until the guest/VM runs out of its time-slice. In one embodiment, the GPU scheduler 1626 waits for the guest ring buffer to become idle before switching, because most GPUs today are non-preemptive, which may impact fairness. To minimize the wait overhead, a coarse-grain flow control mechanism may be implemented, by tracking the command submission to guarantee the piled commands, at any time, are within a certain limit. Therefore, the time drift between the allocated time slice and the execution time is relatively small, compared to the large quantum, so a coarse-grain QoS policy is achieved.

In one embodiment, on a render context switch, the internal pipeline state and I/O register states are saved and restored, and a cache/TLB flush is performed, when switching the render engine among vGPUs 1624. The internal pipeline state is invisible to the CPU, but can be saved and restored through GPU commands. Saving/restoring I/O register states can be achieved through reads/writes to a list of the registers in the render context. Internal caches and Translation Lookaside Buffers (TLB) included in modern GPUs to accelerate data accesses and address translations, must be flushed using commands at the render context switch, to guarantee isolation and correctness. The steps used to switch a context in one embodiment are: 1) save current I/O states, 2) flush the current context, 3) use the additional commands to save the current context, 4) use the additional commands to restore the new context, and 5) restore I/O state of the new context.

As mentioned, one embodiment uses a dedicated ring buffer to carry the additional GPU commands. The (audited) guest ring buffer may be reused for performance, but it is not safe to directly insert the commands into the guest ring buffer, because the CPU may continue to queue more commands, leading to overwritten content. To avoid a race condition, one embodiment switches from the guest ring buffer to its own dedicated ring buffer. At the end of the context switch, this embodiment switches from the dedicated ring buffer to the guest ring buffer of the new VM.

One embodiment reuses the privileged VM 1620 graphics driver to initialize the display engine, and then manages the display engine to show different VM frame buffers.

When two vGPUs 1624 have the same resolution, only the frame buffer locations are switched. For different resolutions, the privileged VM may use a hardware scalar, a common feature in modern GPUs, to scale the resolution up and down automatically. Both techniques take mere milliseconds. In many cases, display management may not be needed such as when the VM is not shown on the physical display (e.g., when it is hosted on the remote servers).

As illustrated in FIG. 16, one embodiment passes through the accesses to the frame buffer and command buffer to accelerate performance-critical operations from a VM 1631-1632. For the global graphics memory space, 2 GB in size, graphics memory resource partitioning and address space ballooning techniques may be employed. For the local graphics memory spaces, each also with a size of 2 GB, a per-VM local graphics memory may be implemented through the render context switch, due to local graphics memory being accessible only by the GPU 1600.

As mentioned, one embodiment partitions the global graphics memory among VMs 1631-1632. As explained above, a split CPU/GPU scheduling mechanism requires that the global graphics memory of different VMs can be accessed simultaneously by the CPU and the GPU, so each VM must be presented at any time with its own resources, leading to the resource partitioning approach for global graphics memory.

Figure 17:
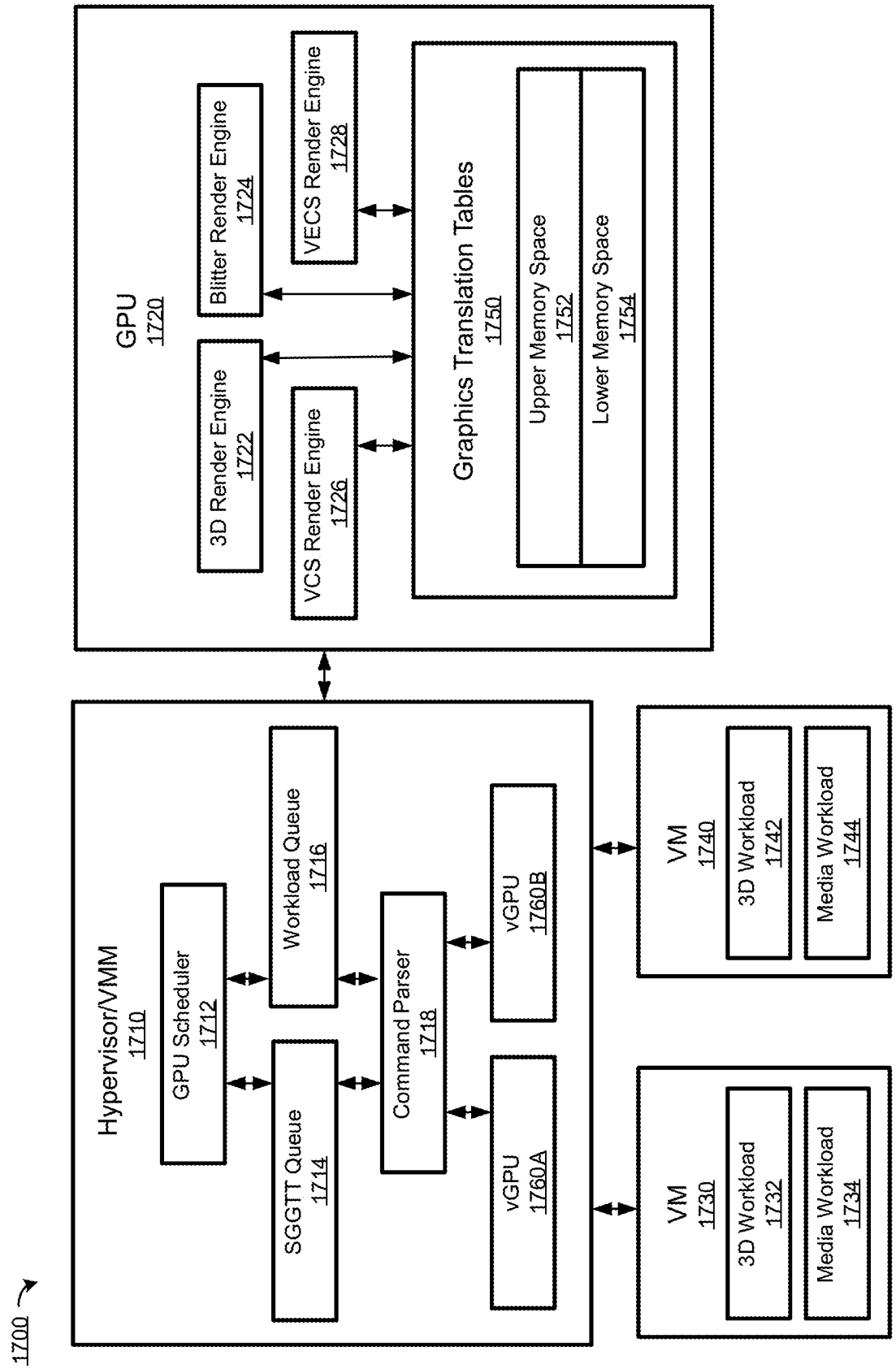
FIG. 17 illustrates an exemplary virtualized graphics processing architecture including virtual graphics processing units (vGPUs)

FIG. 17 illustrates additional details for one embodiment of a graphics virtualization architecture 1700 which includes multiple VMs, e.g., VM 1730 and VM 1740, managed by hypervisor 1710, including access to a full array of GPU features in a GPU 1720. In various embodiments, hypervisor 1710 may enable VM 1730 or VM 1740 to utilize graphics memory and other GPU resources for GPU virtualization. One or more virtual GPUs (vGPUs), e.g., vGPUs 1760A and 1760B, may access the full functionality provided by GPU 1720 hardware based on the GPU virtualization technology. In various embodiments, hypervisor 1710 may track, manage resources and lifecycles of the vGPUs 1760A and 1760B as described herein.

In some embodiments, vGPUs 1760A-B may include virtual GPU devices presented to VMs 1730, 1740 and may be used to interactive with native GPU drivers (e.g., as described above with respect to FIG. 16). VM 1730 or VM 1740 may then access the full array of GPU features and use virtual GPU devices in vGPUs 1760A-B to access virtual graphics processors. For instance, once VM 1730 is trapped into hypervisor 1710, hypervisor 1710 may manipulate a vGPU instance, e.g., vGPU 1760A, and determine whether VM 1730 may access virtual GPU devices in vGPU 1760A. The vGPU context may be switched per quantum or event. In some embodiments, the context switch may happen per GPU render engine such as 3D render engine 1722 or blitter render engine 1724. The periodic switching allows multiple VMs to share a physical GPU in a manner that is transparent to the workloads of the VMs.

GPU virtualization may take various forms. In some embodiments, VM 1730 may be enabled with device passthrough, where the entire GPU 1720 is presented to VM 1730 as if they are directly connected. Much like a single central processing unit (CPU) core may be assigned for exclusive use by VM 1730, GPU 1720 may also be assigned for exclusive use by VM 1730, e.g., even for a limited time. Another virtualization model is timesharing, where GPU 1720 or portions of it may be shared by multiple VMs, e.g., VM 1730 and VM 1740, in a fashion of multiplexing. Other GPU virtualization models may also be used by apparatus 1700 in other embodiments. In various embodiments, graphics memory associated with GPU 1720 may be partitioned, and allotted to various vGPUs 1760A-B in hypervisor 1710.

In various embodiments, graphics translation tables (GTTs) may be used by VMs or GPU 1720 to map graphics processor memory to system memory or to translate GPU virtual addresses to physical addresses. In some embodiments, hypervisor 1710 may manage graphics memory mapping via shadow GTTs, and the shadow GTTs may be held in a vGPU instance, e.g., vGPU 1760A. In various embodiments, each VM may have a corresponding shadow GTT to hold the mapping between graphics memory addresses and physical memory addresses, e.g., machine memory addresses under virtualization environment. In some embodiments, the shadow GTT may be shared and maintain the mappings for multiple VMs. In some embodiments, each VM 1730 or VM 1740, may include both per-process and global GTTs.

In some embodiments, apparatus 1700 may use system memory as graphics memory. System memory may be mapped into multiple virtual address spaces by GPU page tables. Apparatus 1700 may support global graphics memory space and per-process graphics memory address space. The global graphics memory space may be a virtual address space, e.g., 2 GB, mapped through a global graphics translation table (GGTT). The lower portion of this address space is sometimes called the aperture, accessible from both the GPU 1720 and CPU (not shown). The upper portion of this address space is called high graphics memory space or hidden graphics memory space, which may be used by GPU 1720 only. In various embodiments, shadow global graphics translation tables (SGGTTs) may be used by VM 1730, VM 1740, hypervisor 1710, or GPU 1720 for translating graphics memory addresses to respective system memory addresses based on a global memory address space.

In full GPU virtualization, a static global graphics memory space partitioning scheme may face a scalability problem. For example, for a global graphics memory space of 2 GB, the first 512 megabyte (MB) virtual address space may be reserved for aperture, and the rest of them, 1536 MB, may become the high (hidden) graphics memory space. With the static global graphics memory space partitioning scheme, each VM with full GPU virtualization enabled may be allotted with 128 MB aperture and 384 MB high graphics memory space. Therefore, the 2 GB global graphics memory space may only accommodate a maximum of four VMs.

Besides the scalability problem, VMs with limited graphics memory space may also suffer performance degradation. Sometimes, severe performance downgrade may be observed in some media-heavy workloads of a media application when it uses GPU media hardware acceleration extensively. As an example, to decode one channel 1080p H.264/Advanced Video Coding (AVC) bit stream, at least 40 MB of graphics memory may be needed. Thus, for 10 channels of 1080p H264/AVC bit stream decoding, at least 400 MB of graphics memory space may be needed. Meanwhile, some graphic memory space may have to be set aside for surface composition/color conversion, switching display frame buffer during the decoding process, etc. In this case, 512 MB of graphics memory space per VM may be insufficient for a VM to run multiple video encoding or decoding.

In various embodiments, apparatus 100 may achieve GPU graphics memory overcommitment with on-demand SGGTTs. In some embodiments, hypervisor 1710 may construct SGGTTs on demand, which may include all the to-be-used translations for graphics memory virtual addresses from different GPU components' owner VMs.

In various embodiments, at least one VM managed by hypervisor 1710 may be allotted with more than static partitioned global graphics memory address space as well as memory. In some embodiments, at least one VM managed by hypervisor 1710 may be allotted with or able to access the entire high graphics memory address space. In some embodiments, at least one VM managed by hypervisor 1710 may be allotted with or able to access the entire graphics memory address space.

Hypervisor/VMM 1710 may use command parser 1718 to detect the potential memory working set of a GPU rendering engine for the commands submitted by VM 1730 or VM 1740. In various embodiments, VM 1730 may have respective command buffers (not shown) to hold commands from 3D workload 1732 or media workload 1734. Similarly, VM 1740 may have respective command buffers (not shown) to hold commands from 3D workload 1742 or media workload 1744. In other embodiments, VM 1730 or VM 1740 may have other types of graphics workloads.

In various embodiments, command parser 1718 may scan a command from a VM and determine if the command contains memory operands. If yes, the command parser may read the related graphics memory space mappings, e.g., from a GTT for the VM, and then write it into a workload specific portion of the SGGTT. After the whole command buffer of a workload gets scanned, the SGGTT that holds memory address space mappings associated with this workload may be generated or updated. Additionally, by scanning the to-be-executed commands from VM 1730 or VM 1740, command parser 1718 may also improve the security of GPU operations, such as by mitigating malicious operations.

In some embodiments, one SGGTT may be generated to hold translations for all workloads from all VMs. In some embodiments, one SGGTT may be generated to hold translations for all workloads, e.g., from one VM only. The workload specific SGGTT portion may be constructed on demand by command parser 1718 to hold the translations for a specific workload, e.g., 3D workload 1732 from VM 1730 or media workload 1744 from VM 1740. In some embodiments, command parser 1718 may insert the SGGTT into SGGTT queue 1714 and insert the corresponding workload into workload queue 1716.

In some embodiments, GPU scheduler 1712 may construct such on-demand SGGTT at the time of execution. A specific hardware engine may only use a small portion of the graphics memory address space allocated to VM 1730 at the time of execution, and the GPU context switch happens infrequently. To take advantage of such GPU features, hypervisor 1710 may use the SGGTT for VM 1730 to only hold the in-execution and to-be-executed translations for various GPU components rather than the entire portion of the global graphics memory address space allotted to VM 1730.

GPU scheduler 1712 for GPU 1720 may be separated from the scheduler for CPU in apparatus 1700. To take the advantage of the hardware parallelism in some embodiments, GPU scheduler 1712 may schedule the workloads separately for different GPU engines, e.g., 3D render engine 1722, blitter render engine 1724, video command streamer (VCS) render engine 1726, and video enhanced command streamer (VECS) render engine 1728. For example, VM 1730 may be 3D intensive, and 3D workload 1732 may need to be scheduled to 3D render engine 1722 at a moment. Meanwhile, VM 1740 may be media intensive, and media workload 1744 may need to be scheduled to VCS render engine 1726 and/or VECS render engine 1728. In this case, GPU scheduler 1712 may schedule 3D workload 1732 from VM 1730 and media workload 1744 from VM 1740 separately.

In various embodiments, GPU scheduler 1712 may track in-executing SGGTTs used by respective render engines in GPU 1720. In this case, hypervisor 1710 may retain a per-render engine SGGTT for tracking all in-executing graphic memory working sets in respective render engines. In some embodiments, hypervisor 1710 may retain a single SGGTT for tracking all in-executing graphic memory working sets for all render engines. In some embodiments, such tracking may be based on a separate in-executing SGGTT queue (not shown). In some embodiments, such tracking may be based on markings on SGGTT queue 1714, e.g., using a registry. In some embodiments, such tracking may be based on markings on workload queue 1716, e.g., using a registry.

During the scheduling process, GPU scheduler 1712 may examine the SGGTT from SGGTT queue 1714 for a to-be-scheduled workload from workload queue 1716. In some embodiments, to schedule the next VM for a particular render engine, GPU scheduler 1712 may check whether the graphic memory working sets of the particular workload used by the VM for that render engine conflict with the in-executing or to-be-executed graphic memory working sets by that render engine. In other embodiments, such conflict checks may extend to check with the in-executing or to-be-executed graphic memory working sets by all other render engines. In various embodiments, such conflict checks may be based on the corresponding SGGTTs in SGGTT queue 1714 or based on SGGTTs retained by hypervisor 1710 for tracking all in-executing graphic memory working sets in respective render engines as discussed hereinbefore.

If there is no conflict, GPU scheduler 1712 may integrate the in-executing and to-be-executed graphic memory working sets together. In some embodiments, a resulting SGGTT for the in-executing and to-be-executed graphic memory working sets for the particular render engine may also be generated and stored, e.g., in SGGTT queue 1714 or in other data storage means. In some embodiments, a resulting SGGTT for the in-executing and to-be-executed graphic memory working sets for all render engines associated with one VM may also be generated and stored if the graphics memory addresses of all these workloads do not conflict with each other.

Before submitting a selected VM workload to GPU 1720, hypervisor 1710 may write corresponding SGGTT pages into GPU 1720, e.g., to graphics translation tables 1750. Thus, hypervisor 1710 may enable this workload to be executed with correct mappings in the global graphics memory space. In various embodiments, all such translation entries may be written into graphics translation tables 1750, either to lower memory space 1754 or upper memory space 1752. Graphics translation tables 1750 may contain separate tables per VM to hold for these translation entries in some embodiments. Graphics translation tables 1750 may also contain separate tables per render engine to hold for these translation entries in other embodiments. In various embodiments, graphics translation tables 1750 may contain, at least, to-be-executed graphics memory addresses.

However, if there is a conflict determined by GPU scheduler 1712, GPU scheduler 1712 may then defer the schedule-in of that VM, and try to schedule-in another workload of the same or a different VM instead. In some embodiments, such conflict may be detected if two or more VMs may attempt to use a same graphics memory address, e.g., for a same render engine or two different render engines. In some embodiments, GPU scheduler 1712 may change the scheduler policy to avoid selecting one or more of the rendering engines, which have the potential to conflict with each other. In some embodiments, GPU scheduler 1712 may suspend the execution hardware engine to mitigate the conflict.

In some embodiments, memory overcommitment scheme in GPU virtualization as discussed herein may co-exist with static global graphics memory space partitioning schemes. As an example, the aperture in lower memory space 1754 may still be used for static partition among all VMs. The high graphics memory space in upper memory space 1752 may be used for the memory overcommitment scheme. Compared to the static global graphics memory space partitioning scheme, memory overcommit scheme in GPU virtualization may enable each VM to use the entire high graphics memory space in upper memory space 1752, which may allow some applications inside each VM to use greater graphic memory space for improved performance.

With static global graphics memory space partitioning schemes, a VM initially claiming a large portion of memory may only use a small portion at runtime, while other VMs may be in the status of shortage of memory. With memory overcommitment, a hypervisor may allocate memory for VMs on demand, and the saved memory may be used to support more VMs. With SGGTT based memory overcommitment, only graphic memory space used by the to-be-executed workloads may be allocated at runtime, which saves graphics memory space and supports more VMs to access GPU 1720.

Current architectures enable the hosting of GPU workloads in cloud and data center environments. Full GPU virtualization is one of the fundamental enabling technologies used in the GPU Cloud. In full GPU virtualization, the virtual machine monitor (VMM), particularly the virtual GPU (vGPU) driver, traps and emulates the guest accesses to privileged GPU resources for security and multiplexing, while passing through CPU accesses to performance critical resources, such as CPU access to graphics memory. GPU commands, once submitted, are directly executed by the GPU without VMM intervention. As a result, close to native performance is achieved.

Current systems use the system memory for GPU engines to access a Global Graphics Translation Table (GGTT) and/or a Per-Process Graphics Translation Table (PPGTT) to translate from GPU graphics memory addresses to system memory addresses. A shadowing mechanism may be used for the guest GPU page table's GGTT/PPGTT.

The VMM may use a shadow PPGTT which is synchronized to the guest PPGTT. The guest PPGTT is write-protected so that the shadow PPGTT can be continually synchronized to the guest PPGTT by trapping and emulating the guest modifications of its PPGTT. Currently, the GGTT for each vGPU is shadowed and partitioned among each VM and the PPGTT is shadowed and per VM (e.g., on a per process basis). Shadowing for the GGTT page table is straightforward since the GGTT PDE table stays in the PCI bar0 MMIO range. However, the shadow for the PPGTT relies on write-protection of the Guest PPGTT page table and the traditional shadow page table is very complicated (and therefore buggy) and inefficient. For example, the CPU shadow page table has ~30% performance overhead in current architectures. Thus, in some of these systems an enlightened shadow page table is used, which modifies the guest graphics driver to cooperate in identifying a page used for the page table page, and/or when it is released.

The embodiments of the invention include a memory management unit (MMU) such as an I/O memory management unit (IOMMU) to remap from a guest PPGTT-mapped GPN (guest page numbers) to HPN (host page number), without relying on the low efficiency/complicated shadow PPGTT. At the same time, one embodiment retains the global shadow GGTT page table for address ballooning. These techniques are referred to generally as hybrid layer of address mapping (HLAM).

An IOMMU by default cannot be used in certain mediated pass-through architectures since only a single second level translation is available with multiple VMs. One embodiment of the invention resolves this problem, utilizing the following techniques:

1. Using the IOMMU to conduct two layers of translation without the shadow PPGTT. In particular, in one embodiment, the GPU translates from graphics memory address (GM_ADDR) to GPN, and the IOMMU translates from the GPN to HPN, rather than the shadow PPGTT which translates from the GM_ADDR to HPN with write-protection applied to the guest PPGTT.
2. In one embodiment, the IOMMU page table is managed per VM, and is switched (or maybe partially switched) when the vGPU is switched. That is, the corresponding VM's IOMMU page table is loaded when the VM/vGPU is scheduled in.
3. However, the GGTT-mapped addresses are shared in one embodiment, and this global shadow GGTT must remain valid because the vCPU may access the GGTT-mapped address (e.g., such as the aperture), even when the vGPU of this VM is not scheduled in. As such, one embodiment of the invention uses a hybrid layer of address translation which retains the global shadow GGTT, but directly uses the guest PPGTT.
4. In one embodiment, the GPN address space is partitioned to shift the GGTT-mapped GPN address (which becomes input to the IOMMU, like the GPN) to a dedicated address range. This can be achieved by trapping and emulating the GGTT page table. In one embodiment, the GPN is modified from the GGTT with a large offset to avoid overlap with the PPGTT in the IOMMU mapping.

Figure 18:
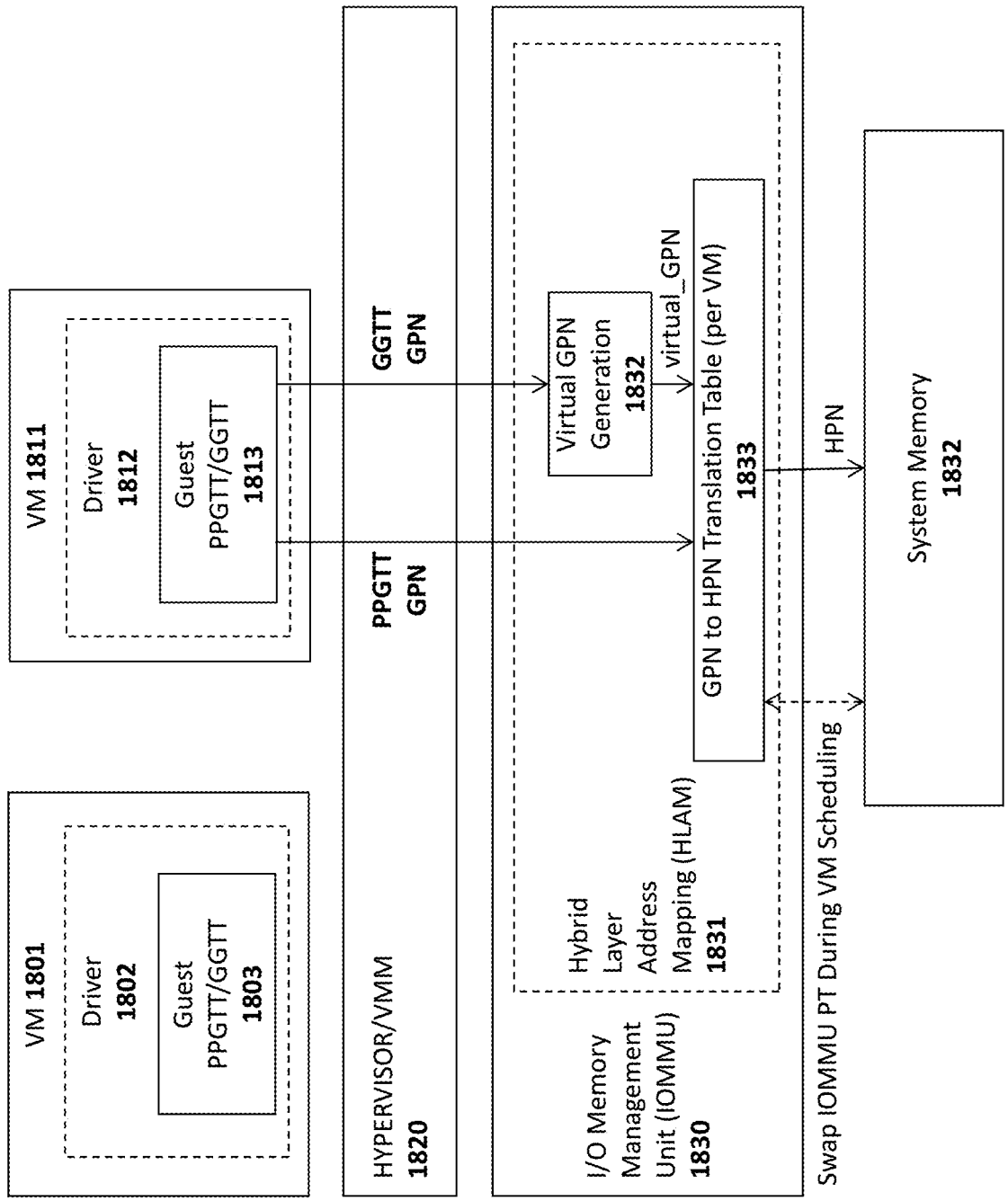
FIG. 18 illustrates one embodiment of a virtualization architecture with an IOMMU.

FIG. 18 illustrates an architecture employed in one embodiment in which an IOMMU 1830 is enabled for device virtualization. The illustrated architecture includes two VMs 1801, 1811 executed on hypervisor/VMM 1820 (although the underlying principles of the invention may be implemented with any number of VMs). Each VM 1801, 1811 includes a driver 1802, 1812 (e.g., a native graphics driver) which manages a guest PPGTT and GGTT 1803, 1813, respectively. The illustrated IOMMU 1830 includes a HLAM module 1831 for implementing the hybrid layer of address mapping techniques described herein. Notably, in this embodiment, shadow PPGTTs are not present.

In one embodiment, the entire Guest VM's (guest VM 1811 in the example) GPN to HPN translation page table 1833 is prepared in the IOMMU mapping, and each vGPU switch triggers an IOMMU page table swap. That is, as each VM 1801, 1811 is scheduled in, its corresponding GPN to HPN translation table 1833 is swapped in. In one embodiment, the HLAM 1831 differentiates between GGTT GPNs and PPGTT GPNs and modifies the GGTT GPNs so that they do not overlap with the PPGTT GPNs when performing a lookup in the translation table 1833. In particular, in one embodiment, virtual GPN generation logic 1832 converts the GGTT GPN into a virtual GPN which is then used to perform a lookup in the translation table 1833 to identify the corresponding HPN.

In one embodiment, the virtual GPN is generated by shifting the GGTT by a specified (potentially large) offset to ensure that the mapped addresses do not overlap/conflict with the PPGTT GPN. In addition, in one embodiment, since the CPU may access the GGTT mapped address (e.g., the aperture) anytime, the global shadow GGTT will always be valid and remain in the per VM's IOMMU mapping 1833.

In one embodiment, the hybrid layer address mapping 1831 solution partitions the IOMMU address range into two parts: a lower part reserved for PPGTT GPN-to-HPN translation, and an upper part reserved for GGTT virtual GPN-to-HPN translation. Since the GPN is provided by the VM/Guest 1811, the GPN should be in the range of the guest memory size. In one embodiment, the guest PPGTT page tables are left unaltered and all GPNs from the PPGTT are directly send to the graphics translation hardware/IOMMU by the workload execution. However, in one embodiment, the MMIO read/write from guest VMs is trapped and GGTT page table changes are captured and altered as described herein (e.g., adding a large offset to the GPN in order to ensure no overlap with the PPGTT mapping in the IOMMU).

Remote Virtualized Graphics Processing

Figure 19:
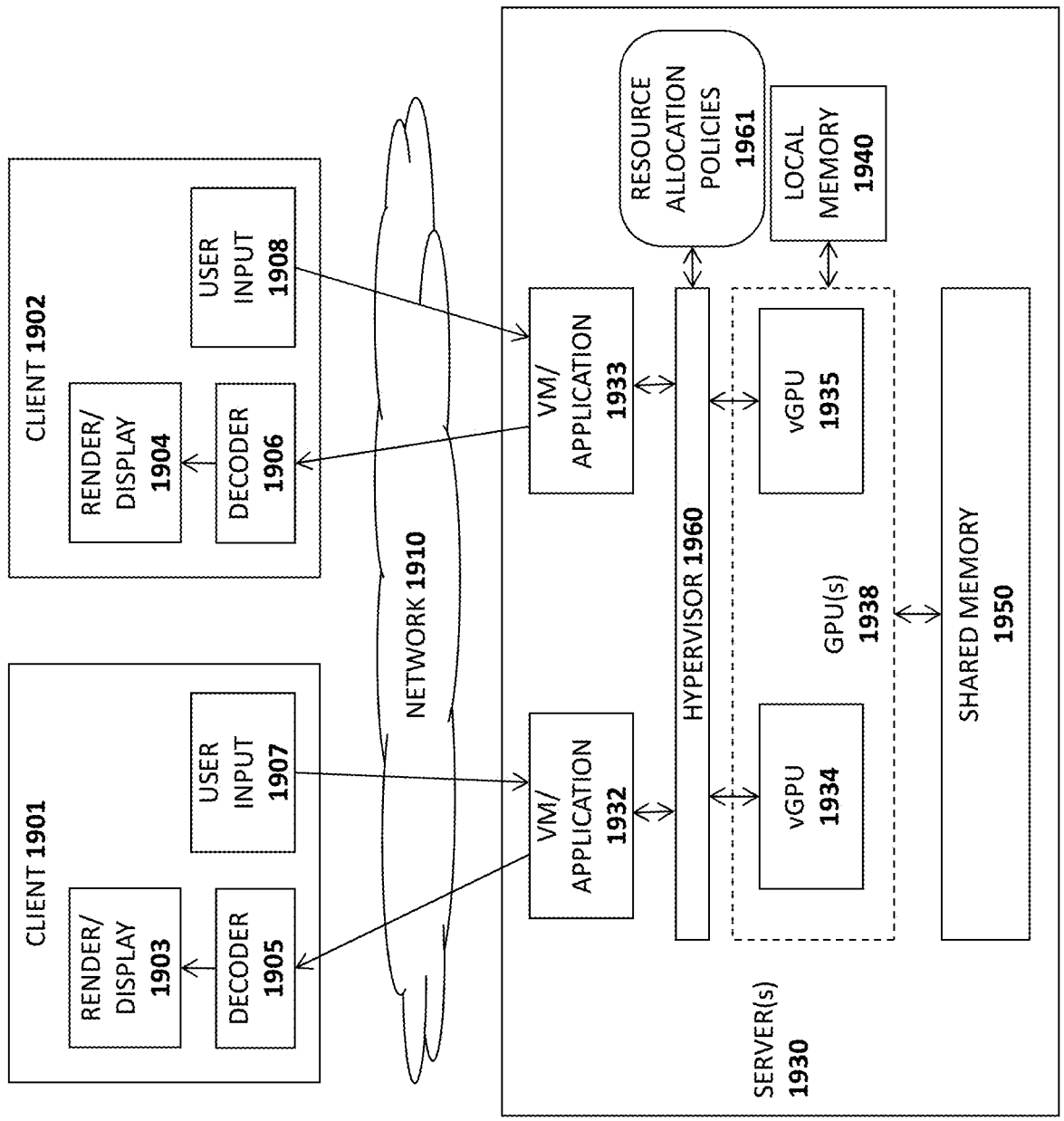
FIG. 19 illustrates one embodiment in which graphics processing is performed on a server.

In some embodiments of the invention, a server performs graphics virtualization, virtualizing physical GPUs and running graphics applications on behalf of clients. FIG. 19 illustrates one such embodiment in which two clients 1901-1902 are connected to servers 1930 over a network 1910 such as the Internet and/or a private network. The servers 1930 implement a virtualized graphics environment in which a hypervisor 1960 allocates resources from one or more physical GPUs 1938, presenting the resources as virtual GPUs 1934-1935 to VMs/applications 1932-1933. The graphics processing resources may allocated in accordance with resource allocation policies 1961 which may cause the hypervisor 1960 to allocate resources based on the requirements of the applications 1932-1933 (e.g., higher performance graphics applications requiring more resources), the user account associated with the applications 1932-1933 (e.g., with certain users paying a premium for higher performance), and/or the current load on the system. The GPU resources being allocated may include, for example, sets of graphics processing engines such as 3D engines, blit engines, execution units, and media engines, to name a few.

In one embodiment, a user of each client 1901-1902 has an account on the service hosting the server(s) 1930. For example, the service may offer a subscription service to provide users remote access to online applications 1932-1933 such as video games, productivity applications, and multi-player virtual reality applications. In one embodiment, the applications are executed remotely on a virtual machine in response to user input 1907-1908 from the clients 1901-1902. Although not illustrated in FIG. 19, one or more CPUs may also be virtualized and used to execute the applications 1932-1933, with graphics processing operations offloaded to the vGPUs 1934-1935.

In one embodiment, a sequence of image frames are generated by the vGPUs 1934-1935 in response to the execution of the graphics operations. For example, in a first person shooter game, a user may specify input 1907 to move a character around a fantasy world. In one embodiment, the resulting images are compressed (e.g., by compression circuitry/logic, not shown) and streamed over the network 1910 to the clients 1901-1902. In one implementation, a video compression algorithm such as H.261 may be used; however, various different compression techniques may be used. Decoders 1905-1906 decode the incoming video streams, which are then rendered on respective displays 1903-1904 of the clients 1901-1902.

Using the system illustrated in FIG. 19, high performance graphics processing resources such as GPUs 1938 may be allocated to different clients who subscribe to the service. In an online gaming implementation, for example, the servers 1930 may host new video games as they are released. The video game program code is then executed in the virtualized environment and the resulting video frames compressed and streamed to each client 1901-1902. The clients 1901-1902 in this architecture do not require significant graphics processing resources. For example, even a relatively low power smartphone or tablet with a decoder 1905-1906 will be capable of decompressing a video stream. Thus, the latest graphics-intensive video games may be played on any type of client capable of compressing video. While video games are described as one possible implementation, the underlying principles of the invention may be used for any form of application which requires graphics processing resources (e.g., graphic design applications, interactive and non-interactive ray tracing applications, productivity software, video editing software, etc).

Different Virtual Machine Views

In one embodiment, a driver and/or slice allocation hardware within the GPU allocates different sets of graphics processing resources ("slices") to different virtual machines (VMs) based on variables such as the processing or latency requirements of the VMs and QoS guarantees associated with the VMs.

Figure 20:
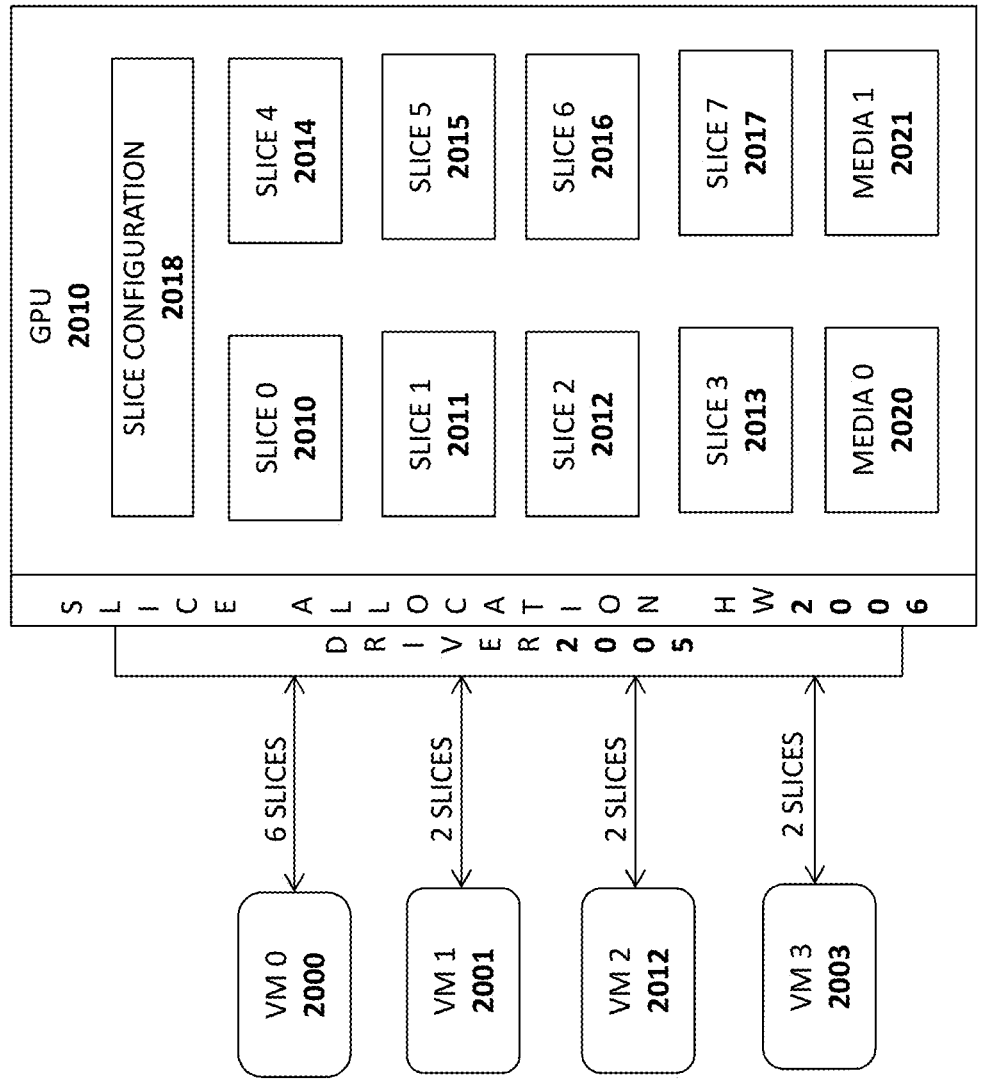
FIG. 20 illustrates one embodiment in which slices are dynamically provisioned to virtual machines.

FIG. 20 illustrates one implementation in which different sets of slices 2010-2017 of the underlying graphics processing hardware are allocated to each of a plurality of VMs 2000-2003. In the illustrated example, VM0 2000 has been allocated 6 slices, and VMs 1-3 2001-2003 have been allocated 2 slices each. In this example, the slices 2010-2017 may comprise a homogeneous or heterogeneous set of graphics processing resources such as execution units (EUs), data ports (e.g., to a communication fabric), shared local memory (SLM), samplers, pixel back end resources, 3D processing resources (e.g., fixed function units), media encode/decode resources, and rasterization resources, to name a few. The media encode/decode units 2020-2021 may be allocated separately from the slices 2010-2017 and/or may be integrated within one or more of the slices 2010-2017. In one embodiment, slice configuration logic 2018 logically subdivides the graphics processing resources of the GPU 2010 into the plurality of slices 2010-1017. For example, the slice configuration logic 2018 may include sets of programmable registers to associate each resource with a particular slice (e.g., using a slice number or other ID code to identify each slice).

The allocation of the slices may be performed by a graphics driver 2005 (or Hypervisor), and/or dedicated slice allocation hardware 2006. The slice allocation hardware 2006, for example, may comprise a set of registers to store the mapping between the VMs 2000-2003 and slices 2010-2014, context data for each of the VMs 2000-2003, circuitry for routing instructions and data between the VMs 2000-2003 and slices 2010-2017.

In one embodiment, slices may be allocated based on the requirements of each particular VM. For example, if an interactive, low latency video game or application is running on VM0 2000, then the driver/allocation hardware 2005-2006 may allocate a relatively larger number of slices to this VM compared with other VMs 2001-2003 that are running non-interactive and/or latency-tolerant applications. In the specific example shown in FIG. 20, VM 2000 is allocated 6 slices while each of the other VMs 2001-2003 are allocated 2 slices.

One embodiment also provides support for per slice preemption. For example, if a particular slice needs to be reallocated from a first VM to a second VM, then the first VM's slice may be preempted on behalf of the second VM. In such a case, the slice allocation hardware 2006 may save the context associated with the first VM may which may be later restored to the same slice or a different slice. In one embodiment, the slice allocations may change dynamically based on the workloads on each of the VMs 2000-2003. For example, if VM1 2001 begins executing a latency-sensitive and/or processing-intensive application (e.g., a 3D interactive video game or virtual reality application), then one or more slices from the other VMs may be dynamically reallocated to VM1 2001.

In addition, in one embodiment, each VM 2000-2003 may be assigned a priority upon which slice allocation and preemption is based. For example, VM0 2000 may be executed on behalf of a user who pays a premium for low latency and/or high performance. As such, VM0 2000 may be allocated a larger number of slices. Priorities also may be set based on the type of app/VM. For example, if a particular VM requires very low latency (e.g., an interactive 3D game), then this VM may be assigned the highest priority available. By contrast, if a VM is non-interactive and/or latency-tolerant, then this VM may be assigned a relatively lower priority. In addition, priorities may be set based on whether an app is a foreground app or a background app (e.g., providing higher priorities to foreground apps).

In addition to assigning slices based on priority and/or processing requirements, one embodiment allocates slices to VMs based on a quality of service (QoS) associated with a VM. For example, certain customers may pay a premium for a guaranteed level of performance. In one embodiment, this level of performance is achieved by guaranteeing a certain number of slices for a particular VM assigned to these customers.

Figure 21:
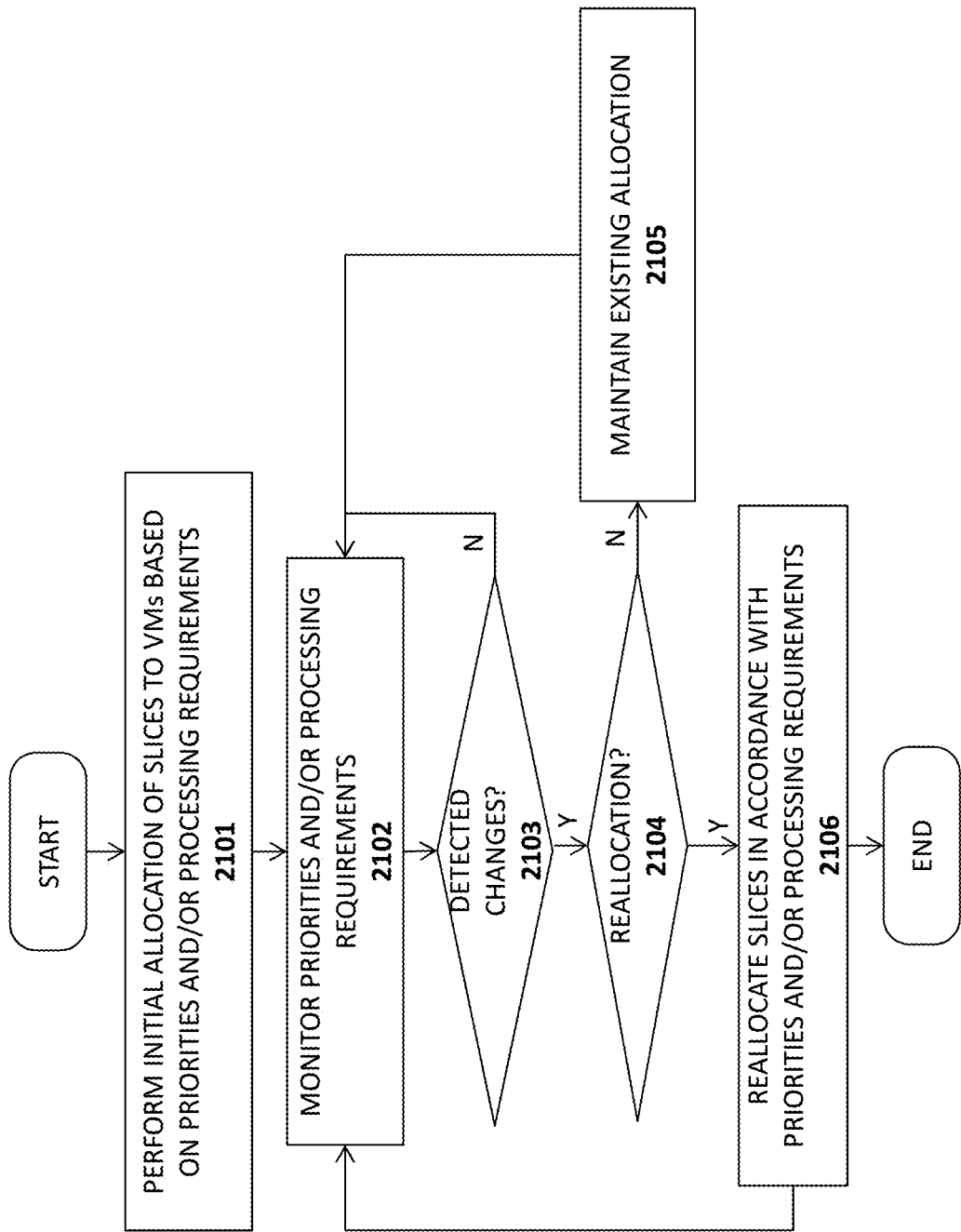
FIG. 21 illustrates a method in accordance with one embodiment of the invention.

A method in accordance with one embodiment of the invention is illustrated in FIG. 21. The method may be implemented within the context of the graphics processing architectures described herein, but is not limited to any particular architecture.

At 2101 an initial allocation of slices to VMs is performed based on priorities and/or processing requirements of the VMs. For example, priorities may be set based on a guaranteed quality of service and processing requirements may be based on the type of applications being run on each VM. At 2102, the priorities and/or processing requirements are monitored to detect changes. If changes are detected, at 2103, then a determination is made as to whether slices should be reallocated between VMs and/or whether new slices should be made available (e.g., changed from a low power/sleep state to an active state). If not, then the existing allocation is maintained at 2105. If so, then at 2106, one or more slices are reallocated in accordance with the priorities and/or processing requirements.

Virtualized Performance Monitoring and Reporting

A virtualized performance counting sub-system of one embodiment performs signaling and counting based on virtual machine (VM) identity. In particular, virtualized counters may be used to monitor different attributes associated with the VM such as instructions completed per cycle (IPC), cache misses, memory accesses, and I/O bandwidth utilization, to name a few. A pool of virtual counters may be allocated dynamically based on VM monitoring requirements. The data collected by the counters may then be used for reporting. Note that any type of GPU events may be logged using the techniques described herein (these techniques are not limited to counters).

Figure 22:
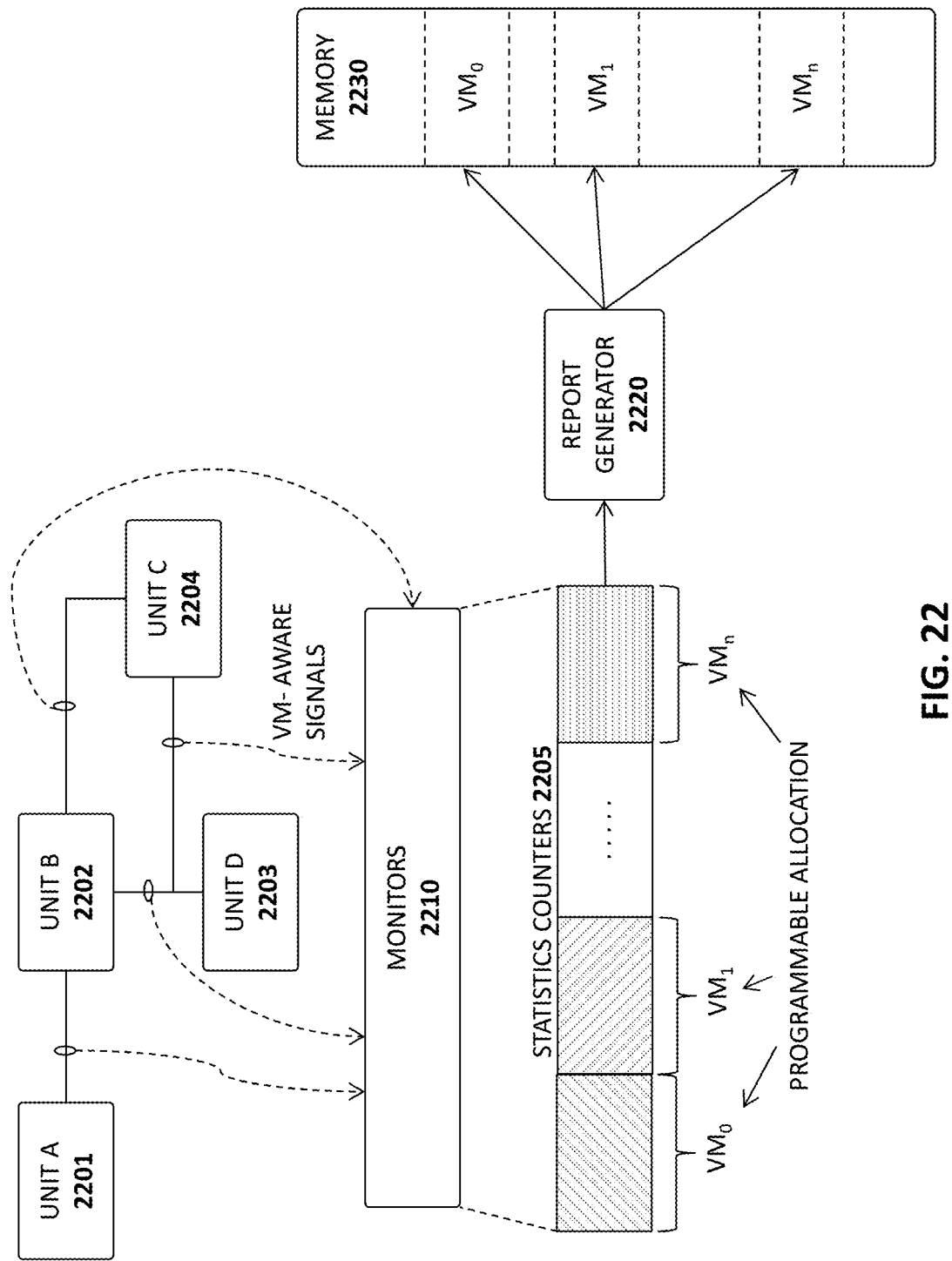
FIG. 22 illustrates one embodiment with a plurality of statistics counters and a report generator.

One embodiment of a virtualized performance counting sub-system includes virtualized counters for signaling and counting based on VM identity. An exemplary architecture is illustrated in FIG. 22, which shows a plurality of units A-D 2201-2203 interconnected over various links. The units may represent any type of unit within a processor such as an instruction fetch unit, a decode unit, a scheduler unit, an execution unit, an individual functional unit within an execution unit, a cache unit, a 3D graphics engine, an instruction dispatch unit, a shader, a traversal unit, a sampler, a media unit, a register allocation unit, a memory controller unit, or a retirement unit, to name a few. In one embodiment, the interfaces on the units 2201-2203 and/or the internal signals over the various buses/links are monitored by a plurality of monitors 2210. For example, the various signals may be monitored for the purposes of performance checking.

In one embodiment, the monitors 2210 tap the internal signals and store monitored results within a set of statistics counters 2205. The statistics counters 2205 may be dynamically programmed to collect statistical data for each VM. For example, one statistics counter 2205 may collect instructions retired per cycle (IPC) for VM0 and another may collect cache misses for VM1. The programmable statistics counters 2205 may accumulate data on a per-thread basis, per-virtual processor basis, per-core basis, and/or per-chip basis. Examples of accumulators include virtual thread/instruction count; virtual and physical core cycles per instruction, cache misses, TLB misses, and pipeline flushes; chip/coherence and data interconnect bus utilization and read-write rates.

In a virtualized embodiment, a hypervisor/VMM may allocate memory buffers for collection of the statistics counter data 2210 for each core, chip, and virtual processor in the system. When a VM is executed, the hypervisor points the VM to one of the memory buffers associated with the VM to start the accumulation of the counters for the VM.

In one embodiment, a report generator 2220, which may be implemented in hardware, software or any combination thereof, reports the values of these statistics counters 2205 out to memory 2230 (e.g., DRAM system memory) where they may be accessed by software, either on demand or periodically. As illustrated, the report generator 2220 may store a report for each VM in a region in memory 2230 associated with each VM. reports may be stored in a designated region in memory. In one embodiment, this VM statistical counter data is made available to external monitoring tools through authorized OS and Hardware Management Console interfaces. In one embodiment, while the reporting is done, each set of counters report out to VM's allocated address space in the memory 2230.

One embodiment performs this monitoring and reporting on a VM-aware basis. This may be accomplished, for example, by attaching a VM ID to each of the signals that are is being monitored (e.g., VM0, VM1, . . . VMn). In one embodiment, the signals comprise packets of data associated with each VM and a VM ID included in each of the packets to identify its associated VM. This information is passed on to the statistics counters 2205 which are provisioned (apportioned) to the various VMs as illustrated. Statistics are then collected by each of these counters for the appropriate VMs.

In one embodiment, multiple sets of special purpose registers may be included in the GPU or CPU to collect performance monitoring data for each VM. The statistics counters 2205, for example, may include the sets of registers dynamically allocated to each VM.

Figure 23:
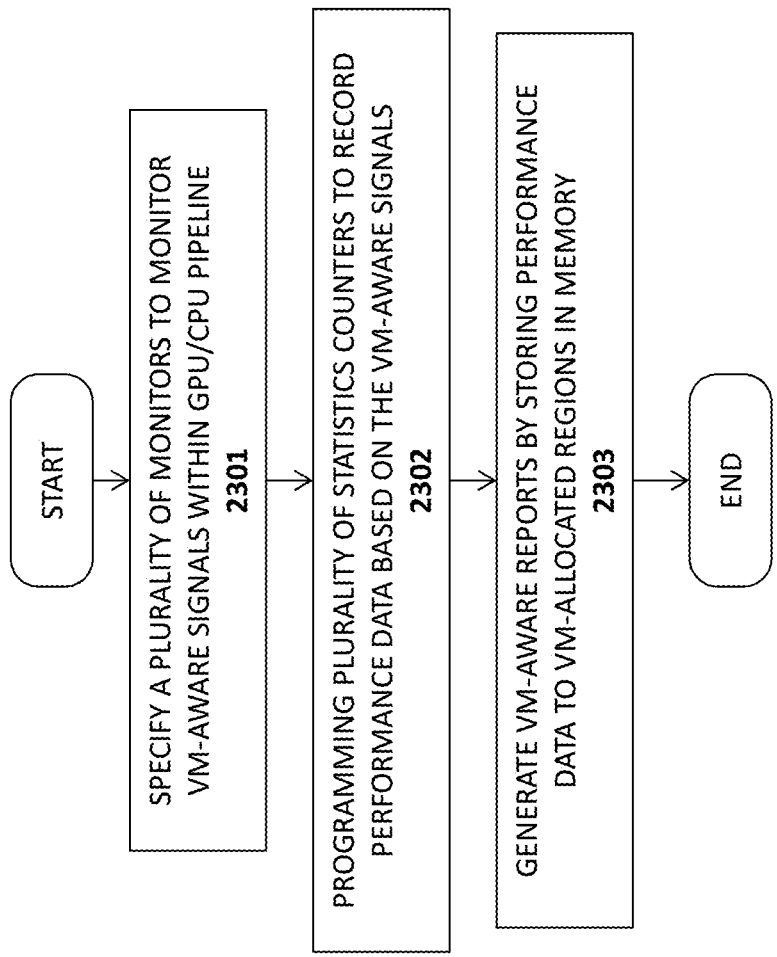
FIG. 23 illustrates a method in accordance with one embodiment of the invention.

A method in accordance with one embodiment of the invention is illustrated in FIG. 23. The method may be implemented within the context of the graphics processing architectures described herein, but is not limited to any particular architecture.

At 2301, a plurality of monitors are specified for monitoring VM-aware signals within a GPU and/or CPU pipeline. At 2302, a plurality of statistics counters are programmed to record performance data based on the VM-aware signals. For example, the performance data data may be stored in different sets of special purpose registers associated with each VM. At 2303, VM-aware reports are generated by storing performance data to regions in memory allocated to each VM.

Figure 24:
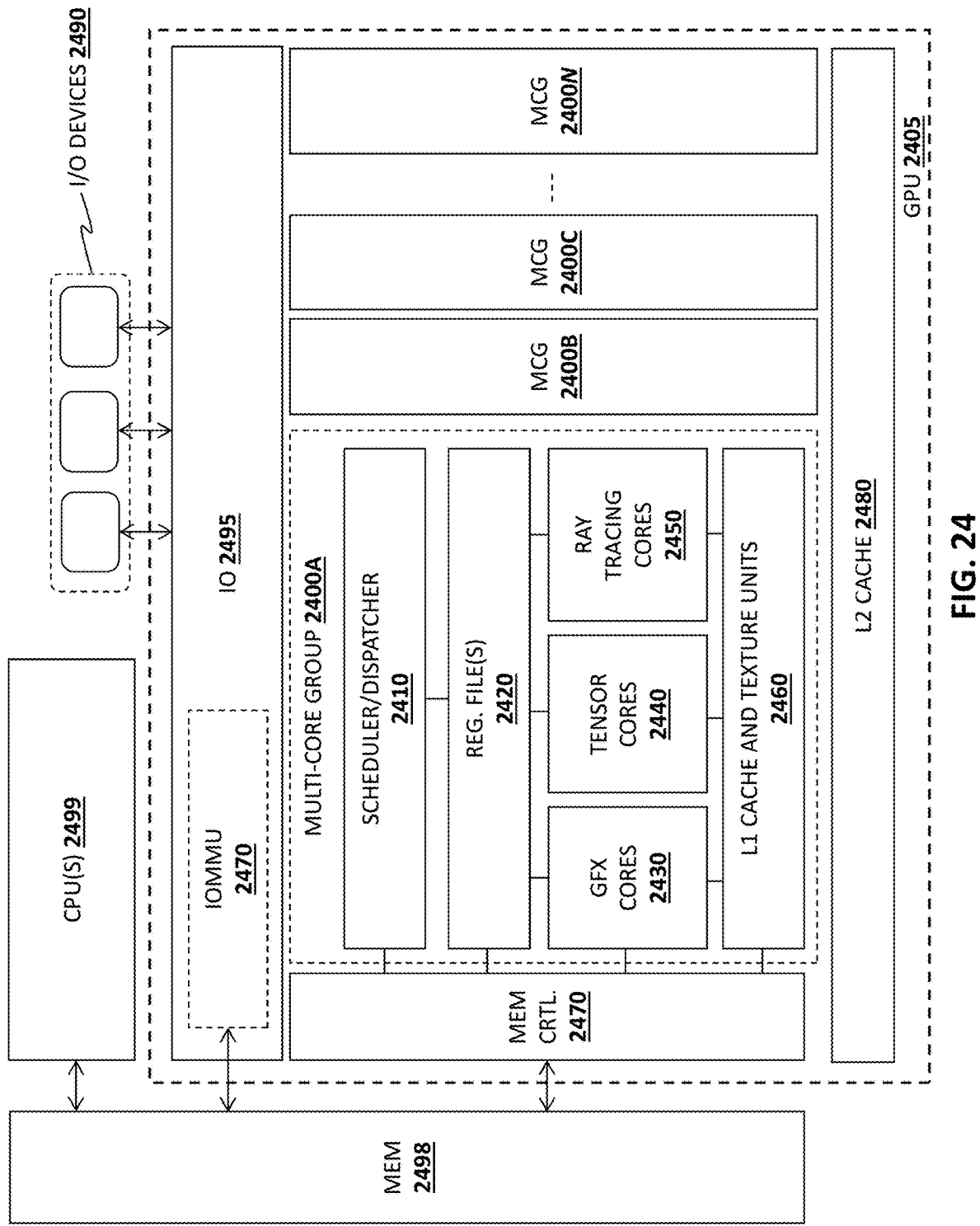
FIG. 24 illustrates an example of a processing architecture which includes ray tracing cores and tensor cores.

FIG. 24 illustrates an exemplary set of graphics processing resources arranged into multi-core groups 2400A-N. While the details of only a single multi-core group 2400A are provided, it will be appreciated that the other multi-core groups 2400B-N may be equipped with the same or similar sets of graphics processing resources.

As illustrated, a multi-core group 2400A may include a set of graphics cores 2430, a set of tensor cores 2440, and a set of ray tracing cores 2450. A scheduler/dispatcher 2410 schedules and dispatches the graphics threads for execution on the various cores 2430, 2440, 2450. A set of register files 2420 store operand values used by the cores 2430, 2440, 2450 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more Level 1 (L1) caches and texture units 2460 store graphics data such as texture data, vertex data, pixel data, ray data, bounding volume data, etc, locally within each multi-core group 2400A. A Level 2 (L2) cache 2480 shared by all or a subset of the multi-core groups 2400A-N stores graphics data and/or instructions for multiple concurrent graphics threads. As illustrated, the L2 cache 2480 may be shared across a plurality of multi-core groups 2400A-N. One or more memory controllers 2470 couple the GPU 2405 to a memory 2498 which may be a system memory (e.g., DRAM) and/or a dedicated graphics memory (e.g., GDDR6 memory).

Input/output (IO) circuitry 2495 couples the GPU 2405 to one or more IO devices 2495 such as digital signal processors (DSPs), network controllers, or user input devices. An on-chip interconnect may be used to couple the I/O devices 2490 to the GPU 2405 and memory 2498. One or more IO memory management units (IOMMUs) 2470 of the IO circuitry 2495 couple the IO devices 2490 directly to the system memory 2498. In one embodiment, the IOMMU 2470 manages multiple sets of page tables to map virtual addresses to physical addresses in system memory 2498. In this embodiment, the IO devices 2490, CPU(s) 2499, and GPU(s) 2405 may share the same virtual address space.

In one implementation, the IOMMU 2470 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 2498). The base addresses of each of the first and second sets of page tables may be stored in control registers and swapped out on a context switch (e.g., so that the new context is provided with access to the relevant set of page tables). While not illustrated in FIG. 24, each of the cores 2430, 2440, 2450 and/or multi-core groups 2400A-N may include translation lookaside buffers (TLBs) to cache guest virtual to guest physical translations, guest physical to host physical translations, and guest virtual to host physical translations.

In one embodiment, the CPUs 2499, GPUs 2405, and IO devices 2490 are integrated on a single semiconductor chip and/or chip package. The illustrated memory 2498 may be integrated on the same chip or may be coupled to the memory controllers 2470 via an off-chip interface. In one implementation, the memory 2498 comprises GDDR6 memory which shares the same virtual address space as other physical system-level memories, although the underlying principles of the invention are not limited to this specific implementation.

In one embodiment, the tensor cores 2440 include a plurality of execution units specifically designed to perform matrix operations, which are the fundamental compute operation used to perform deep learning operations. For example, simultaneous matrix multiplication operations may be used for neural network training and inferencing. The tensor cores 2440 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 2440. The training of neural networks, in particular, requires a significant number matrix dot product operations. In order to process an inner-product formulation of an N×N×N matrix multiply, the tensor cores 2440 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 2440 to ensure that the most efficient precision is used for different workloads (e.g., such as inferencing workloads which can tolerate quantization to bytes and half-bytes).

In one embodiment, the ray tracing cores 2450 accelerate ray tracing operations for both real-time ray tracing and non-real-time ray tracing implementations. In particular, the ray tracing cores 2450 include ray traversal/intersection circuitry for performing ray traversal using bounding volume hierarchies (BVHs) and identifying intersections between rays and primitives enclosed within the BVH volumes. The ray tracing cores 2450 may also include circuitry for performing depth testing and culling (e.g., using a Z buffer or similar arrangement). In one implementation, the ray tracing cores 2450 perform traversal and intersection operations in concert with the image denoising techniques described herein, at least a portion of which may be executed on the tensor cores 2440. For example, in one embodiment, the tensor cores 2440 implement a deep learning neural network to perform denoising of frames generated by the ray tracing cores 2450. However, the CPU(s) 2499, graphics cores 2430, and/or ray tracing cores 2450 may also implement all or a portion of the denoising and/or deep learning algorithms.

In addition, as described above, a distributed approach to denoising may be employed in which the GPU 2405 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 2450 process all BVH traversal and ray-primitive intersections, saving the graphics cores 2430 from being overloaded with thousands of instructions per ray. In one embodiment, each ray tracing core 2450 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 2400A can simply launch a ray probe, and the ray tracing cores 2450 independently perform ray traversal and intersection and return hit data (e.g., a hit, no hit, multiple hits, etc) to the thread context. The other cores 2430, 2440 are freed to perform other graphics or compute work while the ray tracing cores 2450 perform the traversal and intersection operations.

In one embodiment, each ray tracing core 2450 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 2430 and tensor cores 2440) are freed to perform other forms of graphics work.

In one particular embodiment described below, a hybrid rasterization/ray tracing approach is used in which work is distributed between the graphics cores 2430 and ray tracing cores 2450.

In one embodiment, the ray tracing cores 2450 (and/or other cores 2430, 2440) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 2450, graphics cores 2430 and tensor cores 2440 is Vulkan 1.1.85. Note, however, that the underlying principles of the invention are not limited to any particular ray tracing ISA.

In general, the various cores 2450, 2440, 2430 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Apparatus and Method for Provisioning Virtualized Multi-Tile Graphics Processing Hardware In current virtualized graphics processing implementations, system administrators configure and partition the graphics processing resources such that they can meet the requirements of each virtual machine. These requirements may include a guaranteed quality of service, virtual machine isolation, and guaranteed latency requirements for each assigned workload. Provisioning techniques today assign either a full GPU to a virtual machine (VM) or compromise on performance by performing software virtualization (e.g., software-based VM scheduling or API forwarding).

One embodiment of the invention comprises a highly configurable graphics processing architecture which includes tile-based partitioning and single-root input-output virtualization (SR-IOV). This embodiment may be implemented in virtualization software within a graphics driver and/or configuration circuitry within the graphics processor. Specifically, one embodiment of the invention utilizes a hardware-based SR-IOV implementation in combination with multi-tile graphics processing hardware and firmware-based scheduling to create a highly configurable virtualized graphics system.

The SR-IOV standard specifies an architecture for virtualizing devices based on the PCI Express (PCIe) specification. SR-IOV has recently been used to virtualize graphics processing resources and map the graphics processing resources to virtual machines. Specifically, these systems include hardware-virtualized GPUs by defining a virtualized PCIe device to expose one physical function (PF) and a number of virtual functions (VFs) on the PCIe bus. The VFs may inherit the same graphics capabilities of the physical GPU, allowing each one to become fully capable of supporting the GPU's graphics functionality as well as the display. Through the PF, system software controls the enablement and access permissions of the VFs.

The following are details for different virtualized graphics implementations realized by embodiments of the invention using hardware-based SR-IOV, multi-tile graphics architectures, and firmware-based scheduling.

(A) Full Graphics Device to Virtual Machine

Figure 25:
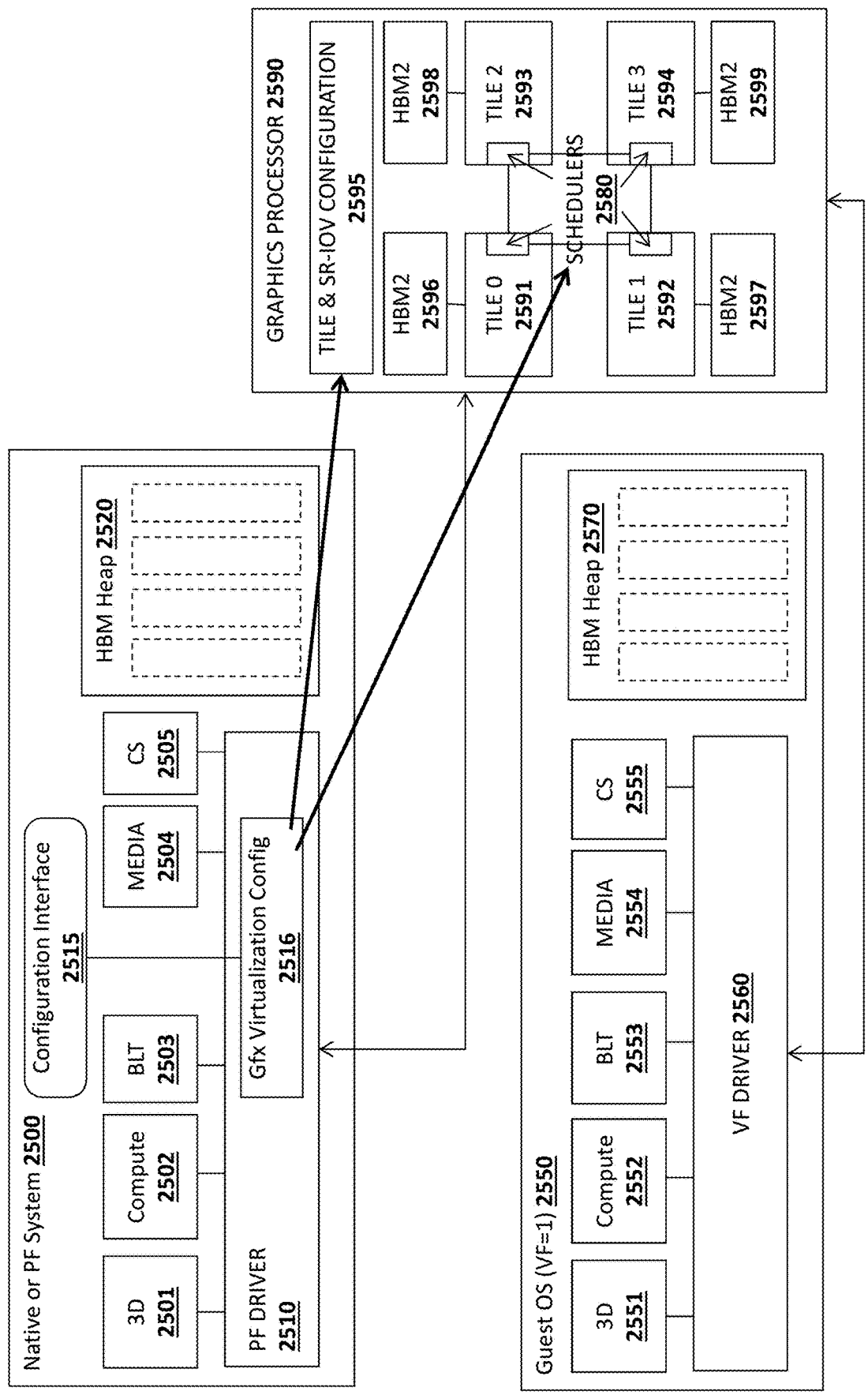
FIG. 25 illustrates an example architecture for virtualizing graphics processing resources.

FIG. 25 illustrates one embodiment in which the graphics processing resources of the graphics processor 2590 are subdivided into a plurality of tiles 2591-2594 where each tile comprises a set of graphics processing resources, as specified by tile configuration circuitry 2595. In the illustrated implementation, each tile 2591-2594 is directly coupled to a high bandwidth memory (HBM) 2596-2599, respectively, operating in accordance with the HBM2 standard. However, the underlying principles of the invention are not limited to any particular memory interface standard. In one embodiment, a set of interconnected schedulers 2580 schedule operations on the processing resources associated with each respective tile 2591-2594.

As illustrated within the context of the native or physical function (PF) system 2500 (e.g., a host CPU and memory), the graphics processing resources of each tile may include an independent 3D graphics engine 2501, a compute engine

2502, a bit block transfer (BLT) engine 2503, a media engine 2504 (e.g., for encoding/decoding video content), and a command streamer engine 2505. The PF system 2500 is coupled to the graphics processor 2590 via a physical function driver 2510 (e.g., a kernel mode driver (KMD)) which provides privileged access to the graphics processing resources of the graphics processor 2590. A HBM heap 2520 stores data processed by each of the graphics engines 2501-2505 within each of the tiles 2591-2594.

In one embodiment, each tile 2591-2594 comprises a scheduler (e.g., a GuC scheduler) 2580 to schedule access by virtual machines to the processing resources. The schedulers 2580 may be interconnected as illustrated to support inter-scheduler communication. In addition, each tile 2591-2594 may include doorbell (DB) circuitry which, in response to receipt of a doorbell signal from a scheduler, driver, or other system component, interrupts execution of the current VM and transitions to execution of the new VM.

In one embodiment, a system administrator or other user configures the graphics virtualization capabilities of the system via a configuration interface 2515. The PF driver 2510 then implements the specified graphics virtualization configuration 2516 by updating tile and SR-IOV configuration circuitry 2595 of the graphics processor 2590 to control how the tiles 2591-2594 are partitioned and how virtual functions are assigned across tiles and virtual machines. In addition, the tile schedulers 2591-2594 are updated with a scheduling policy required to implement the specified configuration.

In the specific configuration in FIG. 25, for example, the associated schedulers provide a single guest OS 2550 with a virtualized instance of the 3D graphics engine 2551, the compute engine 2552, the BLT engine 2553, the media engine 2554, and the command streamer engine 2505 through a VF driver 2560. The virtualized graphics engines operate using a portion of the HBM memories 2596-2599, represented as a virtualized HBM heap 2570.

Consequently, in this configuration, all of the resources of the graphics processor 2590 are allocated to a single virtual machine 2550 (i.e., all tiles and local memory). The VF driver 2560 is coupled to the graphics processor 2590 using pass through or a single SR-IOV function (using a virtual function (VF) of 1 as illustrated). This provisioning arrangement may be used by a Cloud service offering a high end graphics processing or compute services. For pass through implementations, the performance is the same as for a native platform without virtualization and for an SR-IOV implementation, the PF driver 2510 may be present to handle errors/reset/initialization flow but will not perform any rendering or submissions via physical functions. This embodiment does not require specialized VM scheduling as 100% of the graphics processor 2590 is allocated to the single VM 2550. Inter-scheduler communication is the same as for native implementations.

(B) Tile-Based Resource Allocation

Figure 26:
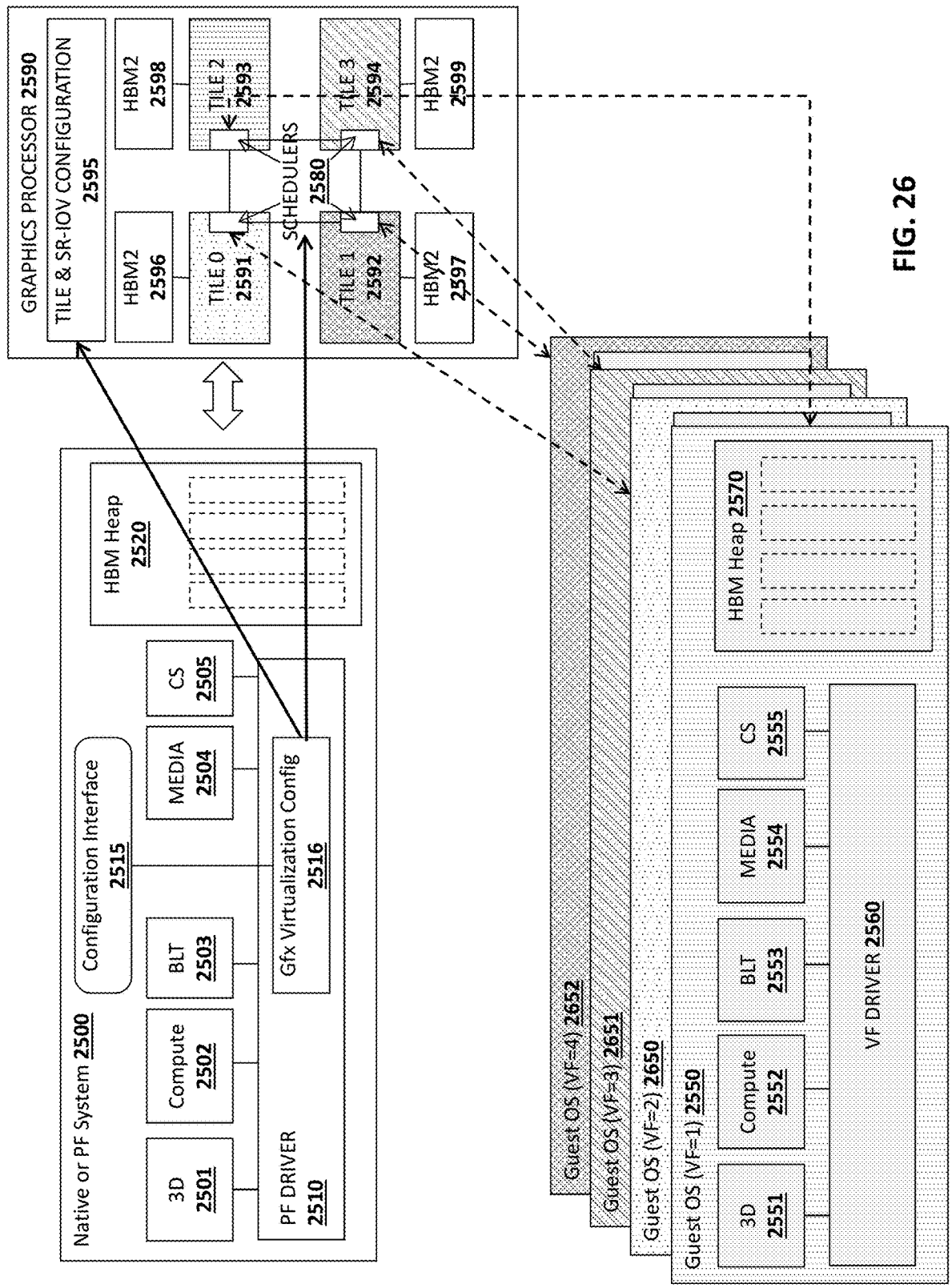
FIG. 26 illustrates an embodiment in which graphics processing resources are subdivided into tiles and the tiles allocated to different virtual machines.

In one embodiment, each virtual machine is scheduled on one tile 2591-2593 of the graphics processor 2590. FIG. 26 illustrates one such embodiment in which tiles 2591, 2592, 2593, and 2594 of the graphics processor 2590 are associated with VMs 2550, 2650, 2651, and 2652, respectively. Consequently, each VM 2550, 2650, 2651, and 2652 is provided with all of the graphics processing resources of one tile (i.e., the doorbell (DB), engines, and local memory for one tile).

In an SR-IOV implementation, the PF driver 2510 running on the host system 2500 is configured to assign a different virtual function (VF1-VF4) to each tile 2591-2594 and each virtual machine 2550, 2560-2562. The VF driver 2560 of each guest OS then uses its assigned VF to access the resources of the corresponding tile. The memory 2596-2599 may be subdivided equally among the tiles. Alternatively, the subdivision of memory 2596-2599 may be flexible and dynamically adjusted based on the processing requirements of each tile.

Thus, in this embodiment, the tile schedulers perform scheduling on a per-VM and per-tile basis where all of the graphics processor budget for each tile is allocated to a single VM. No inter-scheduler communication is required for this embodiment as the VMs are isolated. Each PF driver-VF driver stack is aware of one tile and any cross-tile usage is not supported.

This provisioning scheme may be used, for example, by a Cloud provider offering graphics processing or compute capabilities equivalent to a tile. Here, the isolation of the virtual machines 2550, 2650-2652 and guaranteed Quality of Service (QoS) are provided through a single tile of the graphics processing resources.

(C) Time Quantum Shared Graphics Processing Device

Figure 27:
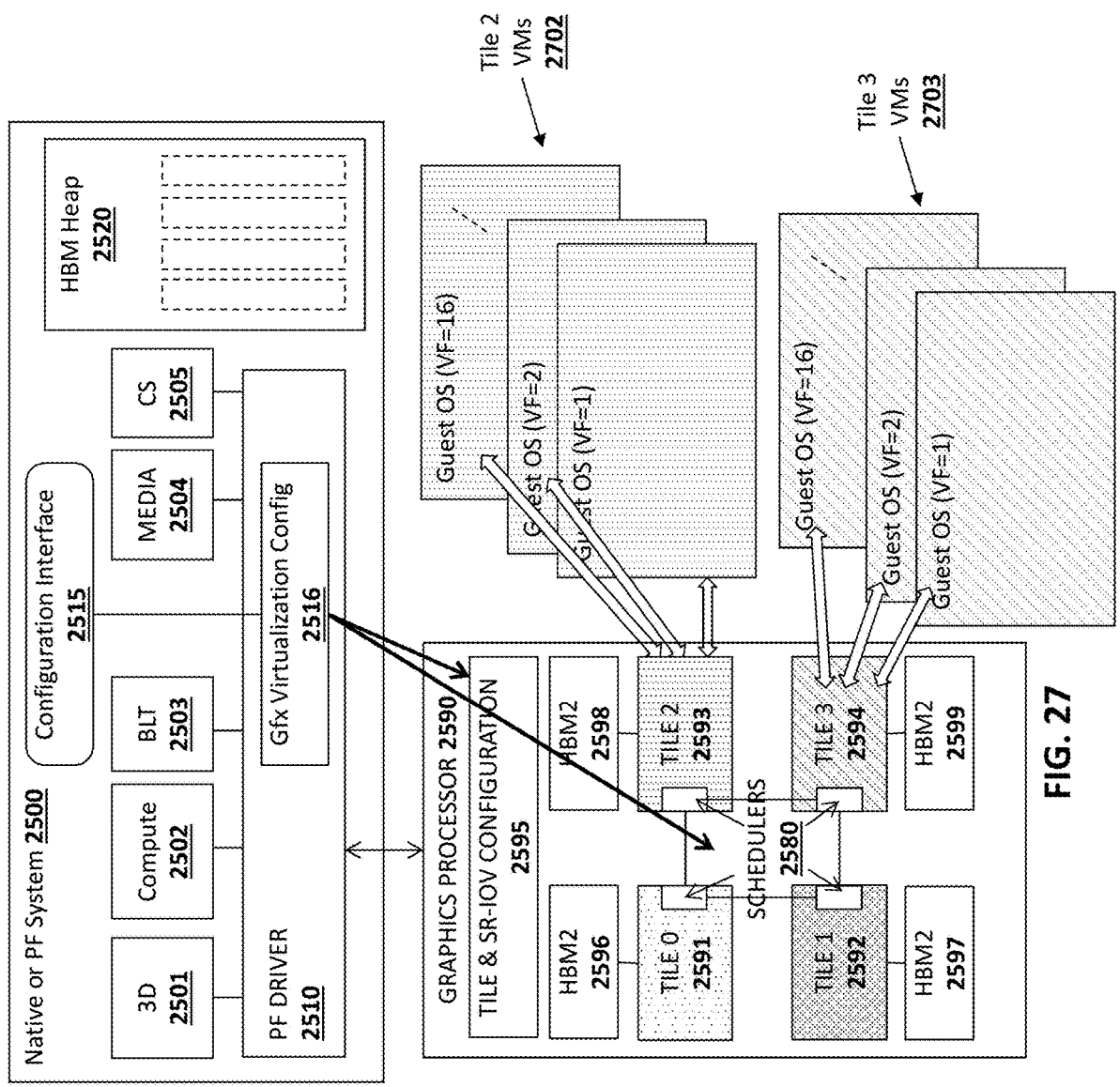
FIG. 27 illustrates an embodiment in which each tile is shared among multiple virtual machines.

Referring to FIG. 27, the graphics processor 2590 is again subdivided into four tiles 2591-2594 in this embodiment. However, instead of mapping each tile to a single VM, each tile is shared among a plurality of VMs. For example, tile 2594 ("Tile 3") is illustrated being time shared among a set of VMs 2703 and tile 2593 ("Tile 2") is time shared by another set of VMs 2702.

In one embodiment, the schedulers 2580 schedule in each VM 2702-2703 for a time quantum required to ensure the VM runs at a designated quality of service (QoS) and/or latency (e.g., one agreed upon by the Cloud service provider and VM user).

In one embodiment, some maximum number of VMs can be specified for each tile (e.g., 8, 16, 32, etc). In addition, a minimum time quantum may be specified (e.g., 4 mSec to 64 mSec) where each VM is assigned a time quantum equal to or greater than the minimum value. The network administrator or automated system configuring the VM must map the VM to its designated quantum based on the QoS and latency requirements.

By way of example, and not limitation, if the guest OS with a VF set to 1 in the set of VMs 2703 requires 60 FPS of video playback and the frame decode and compose/present presentation requires 4 msec, then a maximum of 4 such VMs can be supported on the tile 2594. After that the tile will be over-subscribed which will result into frame drops.

Figure 28:
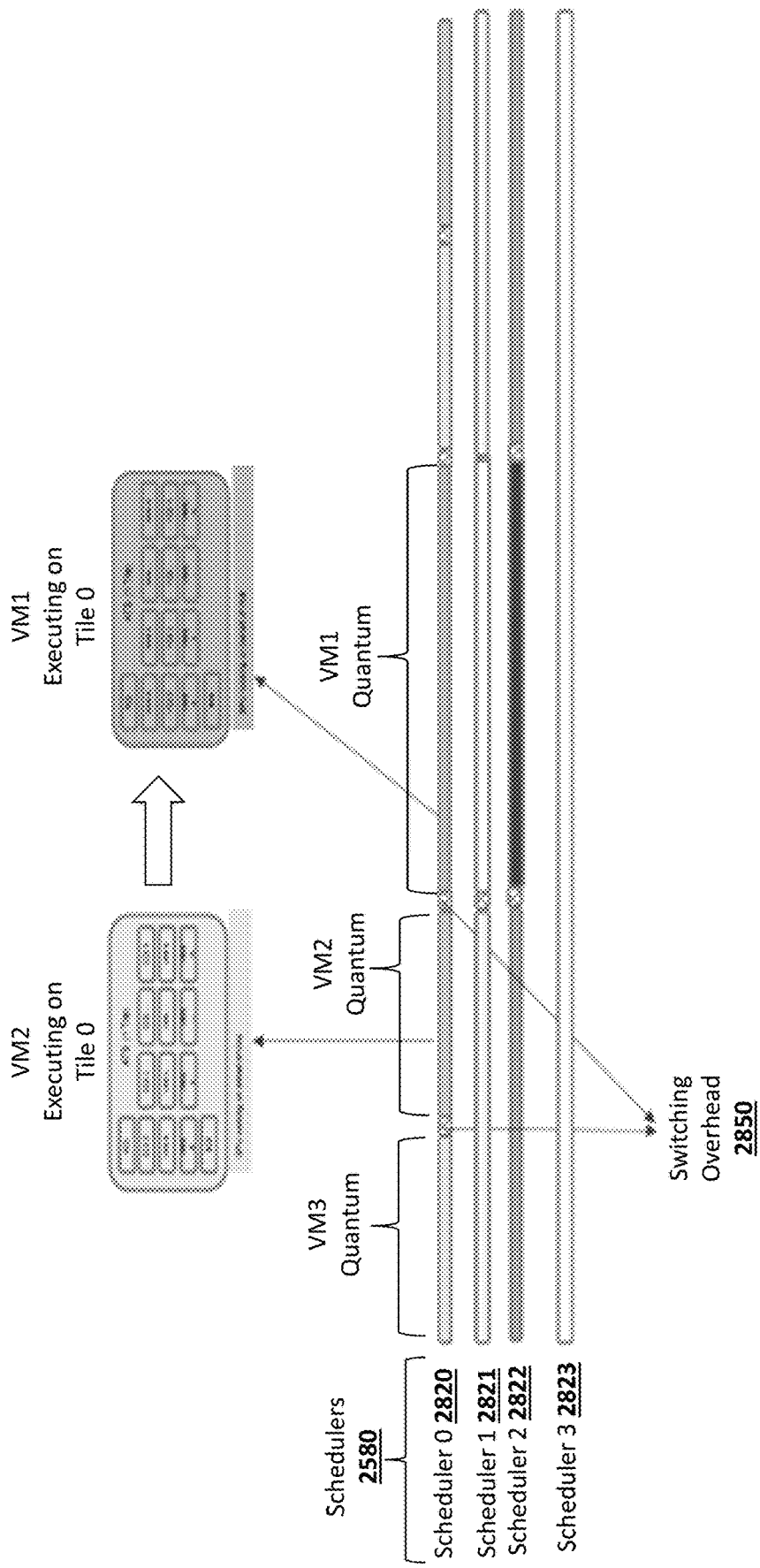
FIG. 28 illustrates virtual machine quanta managed by a set of schedulers.

As mentioned, in one embodiment, each tile 2591-2594 includes an integrated VM scheduler 2580 (e.g., referred to as the tile's GuC in certain implementations) which will perform the VM context switching in accordance with each VM's time quantum. As illustrated FIG. 28, each tile can be loaded differently and each tile scheduler can switch VMs at different rates. In the illustrated example, Scheduler 0 2820 schedules three VMs on Tile 0, where VM1 is allocated a 50% time quantum, VM2 is allocated a 25% time quantum, and VM3 is allocated a 25% time quantum. Scheduler 1 2821 schedules one VM on Tile 1 using a 50% time quantum with the other 50% time quantum being unused. Scheduler 2 2822 schedules two VMs on Tile 2, with each VM allocated a 50% time quantum. Scheduler 3 of Tile 3 does not schedule any VMs (0% tile utilization). As illustrated, there is a switching overhead 2850 associated with the context switching performed by the schedulers 2580 (e.g., to save the current execution state of the prior VM and restore the execution state of the next VM to be executed on the tile).

(D) Time Quantum-Based Shared Single Tile Device

Figure 29:
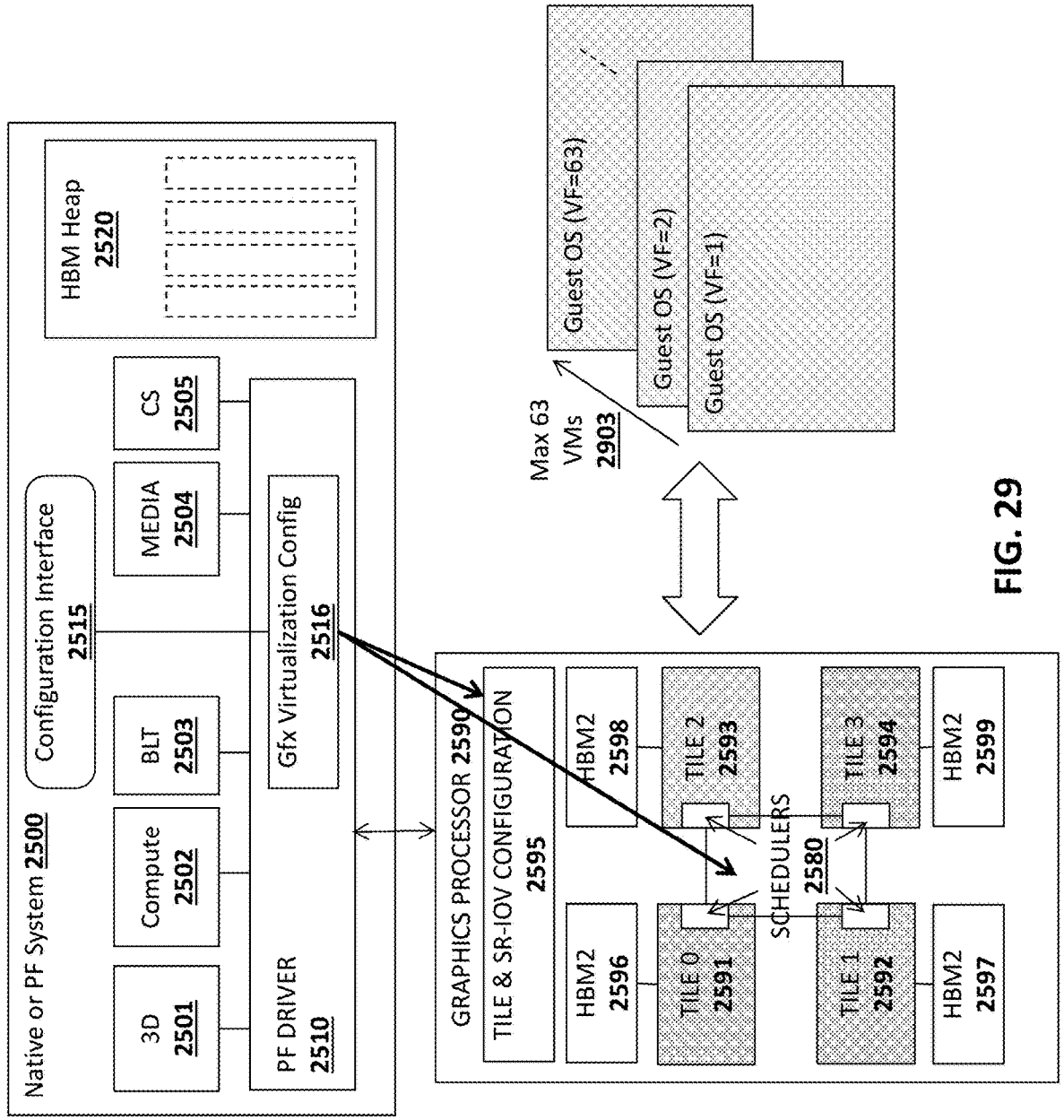
FIG. 29 illustrates an embodiment in which all tiles of a graphics processor are shared among virtual machines.

FIG. 29 illustrates one embodiment of the invention in which the entire graphics processor 2590 is shared between a plurality of VMs 2903. The graphics processing resources such as the doorbell and local memory will be carved out to meet the QoS and latency required by each VM.

In this implementation, each VM is assigned a time quantum interval to run entirely on the GPU. The minimum quantum may be specified (e.g., 4 ms to 64 ms). The network administrator assigning VMs to the graphics processor 2590 must decide on the number of VMs and the quantum for each VM based on bandwidth and latency. Over-subscription can result into performance issues/frame drops.

In this embodiment, a global VM scheduler may be used to schedule across all of the individual tiles 2591-2594. The global VM scheduler may be implemented in separate scheduling circuitry and/or may be implemented by one of the individual schedulers 2580. In this example, tile 0 is designated as the root tile and its scheduler 2820 uses inter-scheduler communication to control VM switching on all schedulers 2580.

Figure 30:
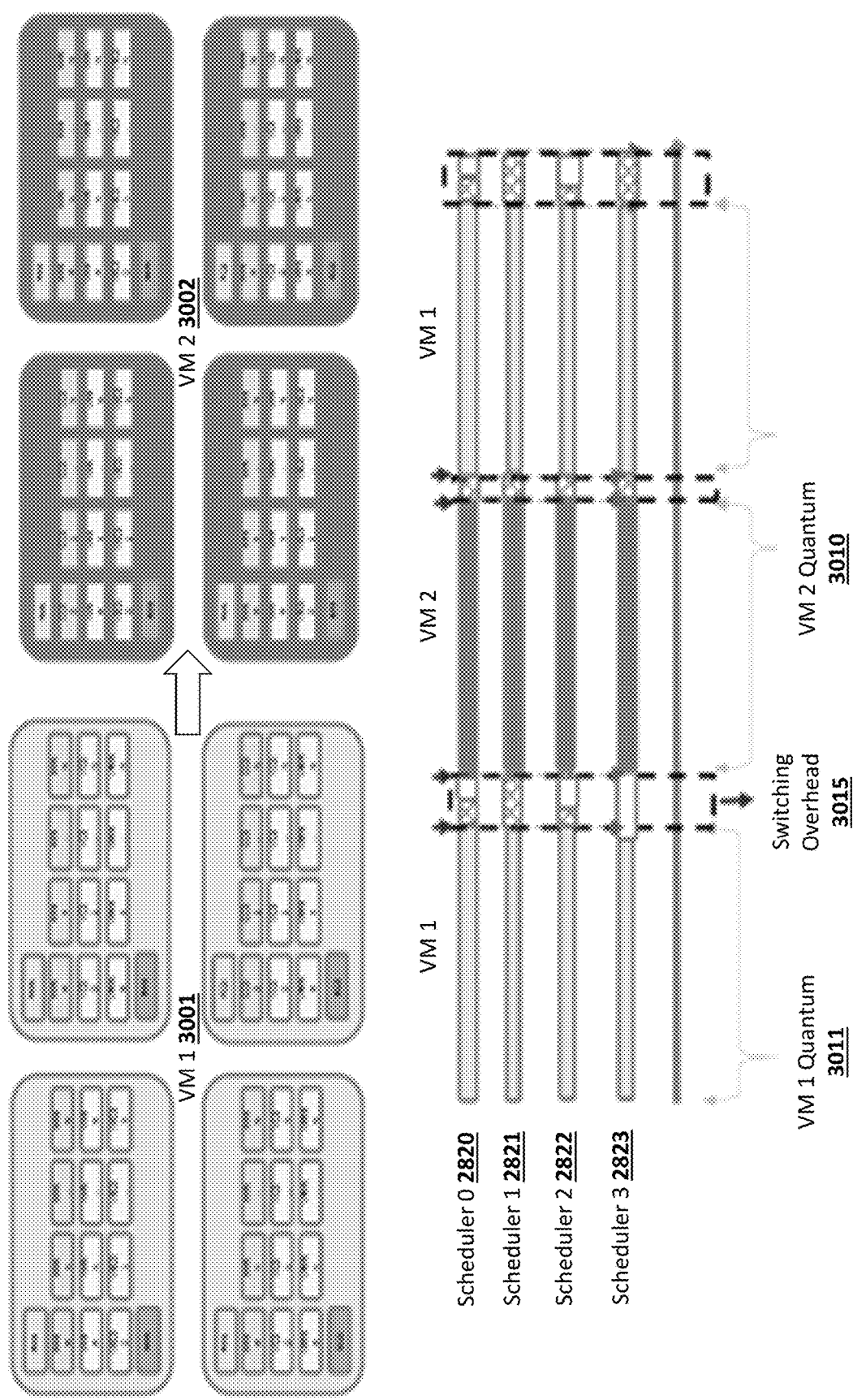
FIG. 30 illustrates an example in which virtual machines are allocated access to tiles in accordance with scheduled quanta.

FIG. 30 illustrates how scheduler 0 2820 generates requests to the other schedulers 2821-2823 to perform VM context switches for two VMs: VM1 3001 and VM2 3002. VM1 3001 is provided with all processing resources of the graphics processor over VM1 quantum 3011. In response to a request by the root scheduler 2820 to perform a VM switch, all schedulers 2820-2823 save the VM1 state associated with each respective tile, load the VM2 state for each tile and execute VM2 3002 for the specified quantum 3010.

As indicated, there is a switching overhead 3015 required for switching between VMs which is the time it takes for the root scheduler 0 2820 to transmit the VM switch command, for VM1 state to be saved, and for the VM2 state to be restored for each tile. Note that the execution quantum on each tile may not be the same due to different delays in notification and switching latency.

(E) Schedule as Native with Virtualized Memory

Figure 31:
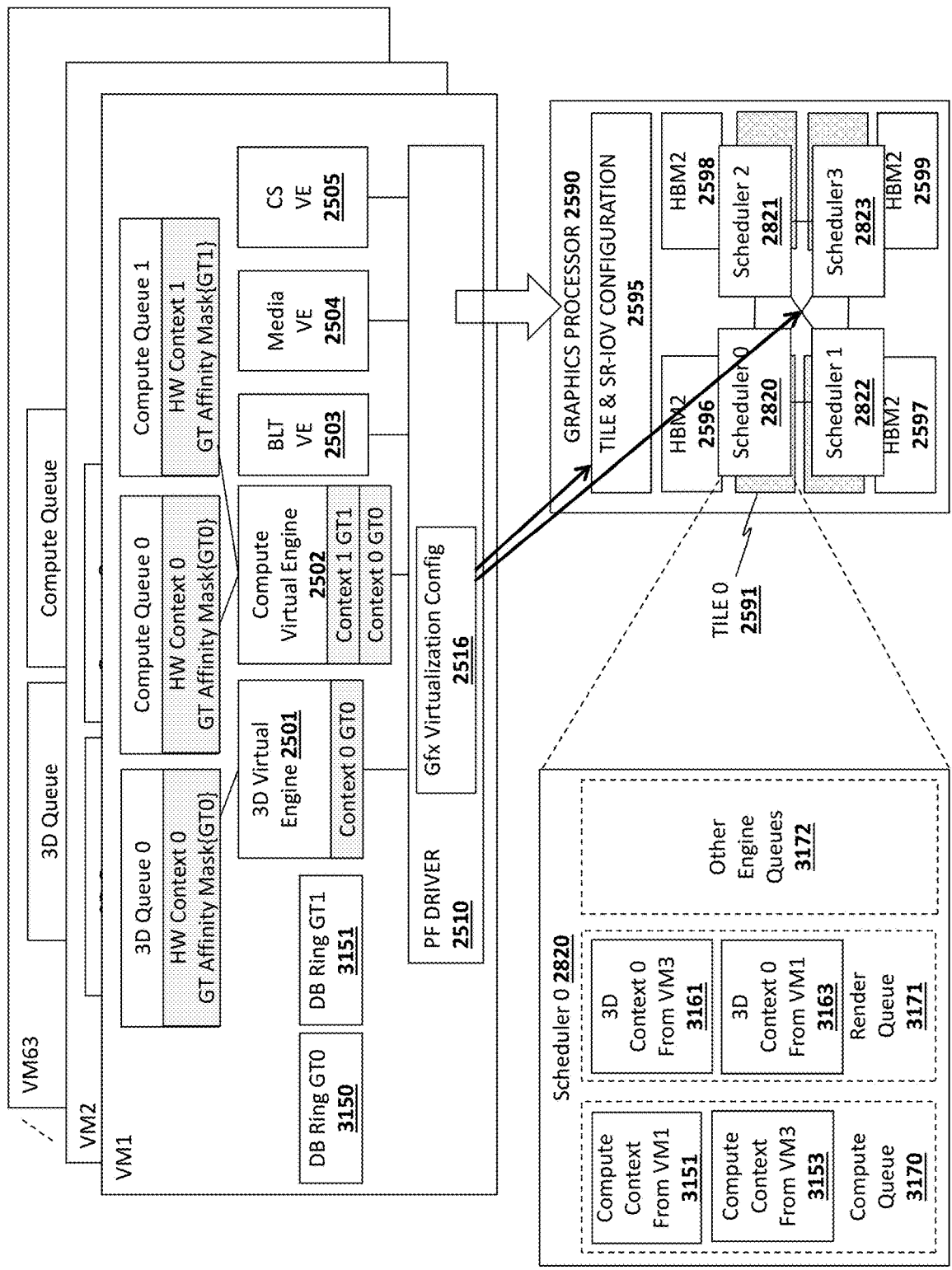
FIG. 31 illustrates another embodiment of the invention for scheduling virtual machines on the tiles of a graphics processor.

FIG. 31 illustrates a provisioning scheme in which the graphics virtualization configuration 2516 provides each of 63 VMs (VM1-VM63) with full access to all tiles of the graphics processor 2590 during a designated time quantum. This embodiment maximizes utilization of the graphics processor 2590 at the cost of workload isolation. For example, if one workload goes down, this may affect other VMs which may be simultaneously running on graphics processor 2590.

In this provisioning scheme, the schedulers 2820-2823 treat scheduling in the same or similar manner as native hardware scheduling. Rather than separate, per-VM queues, each scheduler 2820-2823 maintains a queue for each engine 2501-2505 which includes commands from multiple VMs. For example, scheduler 0 2820 (highlighted in FIG. 31) includes a single compute queue 3170 to store commands directed to the compute engine of tile 2591 from all VMs and a single render queue 3171 to store commands directed to the 3D engine of tile 2591 from all VMs. In FIG. 31, commands for compute contexts from VM1 and VM3 are shown within the compute queue 3170 and commands for 3D context 0 from VM1 and VM3 are shown within the render queue 3171. Similarly, scheduler 0 2820 draws from other engine queues 3172 to store commands/data for the other graphics processor engines (e.g., BLT engine 2503, media engine 2504, and command streamer engine 2505).

When the time quantum for VM1 arrives, schedulers 2820-2823 schedule work from VM1 on the graphics processor 2590 using native hardware scheduling with the exception that each scheduler will program the VF# corresponding to VM1 into the tile and SR-IOV configuration 2595 of the graphics processor. When VM1 is running within its execution quantum, it may be provided with full access to the execution resources of the graphics processor 2590. Thus, for the designated time quantum, the "virtual" engines 2501-2505 provide the same performance as if running natively on the graphics processor 2590.

Other relevant components to the architecture shown in FIG. 31 include hardware context affinity masks GT0-GT1 to indicate an affinity for a particular tile or functional unit. For example, affinity mask GT0 may indicate an affinity of context 0 for a particular set of processing resources (e.g., tile 0 2591) and mask GT1 may indicate an affinity of context 1 for another set of processing resources (e.g., tile 1 2592). Also illustrated is doorbell circuitry 3150-3151 (e.g., registers) which, in response to receipt of a doorbell signal from a scheduler, driver, or other system component, sets one or more bits to interrupt execution of the VM associated with the doorbell (e.g., VM1) and transition to execution of the new VM (e.g., VM3).

While the embodiments described above focus specifically on an SR-IOV implementation, other virtualization techniques may be employed including, but not limited to, multi-root IO virtualization (MR-IOV) techniques. In addition, while the tiles are described above in the context of various specific graphics engines, a "tile" as used herein may comprise any grouping of graphics processing resources including memory/storage resources and processing resources.

A method in accordance with one embodiment of the invention is illustrated in FIG. 32. The method may be implemented within the context of the architectures described above, but is not limited to any specific processor or system architecture.

At 3201, a tile-based resource allocation policy and a virtualization policy are specified. At 3202, processing resources (e.g., of a graphics processor) are partitioned into a plurality of tiles in accordance with the specified tile-based resource allocation policy. At 3203, a virtualized execution environment is implemented comprising a plurality of virtual machines and, at 3204, tile-based allocation of the processing resources is performed in accordance with the specified virtualization policy.

In the embodiments described above, the term "engine" or "module" or "logic" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, an engine, module, or logic may be implemented in firmware, hardware, software, or any combination of firmware, hardware, and software.

EXAMPLES

The following are example implementations of different embodiments of the invention.

Example 1. A graphics processing apparatus comprising: processing resources to process commands including graphics commands and generate results; resource partitioning circuitry to partition the processing resources into a plurality of tiles in accordance with a specified tile-based resource allocation policy; and graphics virtualization circuitry to perform tile-based allocation of the processing resources to a plurality of virtual machines in accordance with a specified virtualization policy, the virtual machines to be executed in a virtualized execution environment.

Example 2. The graphics processing apparatus of example 1 wherein responsive to the specified tile-based resource allocation policy, the resource partitioning circuitry is to allocate an equal amount of the processing resources to each tile.

Example 3. The graphics processing apparatus of example 2 further comprising: a plurality of high bandwidth memories (HBMs), each HBM directly coupled to one of the plurality of tiles.

Example 4. The graphics processing apparatus of example 3 wherein in accordance with the specified tile-based resource allocation policy, each tile is to be allocated at least one 3D graphics engine to perform 3D graphics processing and at least one compute engine to perform general purpose graphics processing operations.

Example 5. The graphics processing apparatus of example 2 wherein the virtualization circuitry is configurable by user selection of different virtualization policies, wherein responsive to a first specified virtualization policy, the graphics virtualization circuitry is to allocate at least one tile for continuous use by a virtual machine.

Example 6. The graphics processing apparatus of example 5 wherein responsive to a second specified virtualization policy, the virtualization circuitry is to share at least one tile among a first plurality of virtual machines in accordance with a first plurality of time quanta, each time quantum of the first plurality associated with at least one of the first plurality of virtual machines.

Example 7. The graphics processing apparatus of example 6 wherein responsive to a third specified virtualization policy, the virtualization circuitry is to allocate all tiles to each virtual machine in accordance with a second plurality of time quanta, each time quantum of the second plurality associated with at least one of the first plurality of virtual machines.

Example 8. The graphics processing apparatus of example 7 wherein each time quantum of the first and/or second plurality of time quanta are to be specified by a user within the second and/or third virtualization policies.

Example 9. The graphics processing apparatus of example 1 further comprising: scheduling circuitry to schedule operations from the plurality of virtual machines on the plurality of tiles in accordance with the tile-based resource allocation policy and the virtualization policy.

Example 10. The graphics processing apparatus of example 9 wherein the scheduling circuitry comprises a plurality of schedulers, each scheduler allocated to at least one of the tiles.

Example 11. A method comprising: providing a specified tile-based resource allocation policy and a specified virtualization policy; partitioning a set of processing resources into a plurality of tiles in accordance with the specified tile-based resource allocation policy; and executing a plurality of virtual machines in a virtualized execution environment; and performing tile-based allocation of the processing resources to the plurality of virtual machines in accordance with a specified virtualization policy.

Example 12. The method of example 11 wherein responsive to the specified tile-based resource allocation policy, allocating an equal amount of the processing resources to each tile.

Example 13. The method of example 12 wherein each tile is to include a high bandwidth memory (HBM) directly coupled thereto.

Example 14. The method of example 13 wherein, in accordance with the specified tile-based resource allocation policy, each tile is to be allocated at least one 3D graphics engine to perform 3D graphics processing and at least one compute engine to perform general purpose graphics processing operations.

Example 15. The method of example 12 wherein responsive to a first specified virtualization policy selected by a user, allocating at least one tile for continuous use by a virtual machine.

Example 16. The method of example 15 wherein responsive to a second specified virtualization policy selected by the user, sharing at least one tile among a first plurality of virtual machines in accordance with a first plurality of time quanta, each time quantum of the first plurality associated with at least one of the first plurality of virtual machines.

Example 17. The method of example 16 wherein responsive to a third specified virtualization policy selected by the user, allocating all tiles to each virtual machine in accordance with a second plurality of time quanta, each time quantum of the second plurality associated with at least one of the first plurality of virtual machines.

Example 18. The method of example 17 wherein each time quantum of the first and/or second plurality of time quanta are to be specified by the user within the second and/or third virtualization policies.

Example 19. The method of example 11 further comprising:
scheduling operations from the plurality of virtual machines on the plurality of tiles in accordance with the tile-based resource allocation policy and the virtualization policy.

Example 20. The method of example 19 wherein scheduling is implemented with a plurality of schedulers, each scheduler allocated to at least one of the tiles.

Example 21. A machine-readable medium having program code stored thereon which, when executed by a machine, causes the machine to perform the operations of: providing a specified tile-based resource allocation policy and a specified virtualization policy; partitioning a set of processing resources into a plurality of tiles in accordance with the specified tile-based resource allocation policy; and executing a plurality of virtual machines in a virtualized execution environment; and performing tile-based allocation of the processing resources to the plurality of virtual machines in accordance with a specified virtualization policy.

Example 22. The machine-readable medium of example 21 wherein responsive to the specified tile-based resource allocation policy, allocating an equal amount of the processing resources to each tile.

Example 23. The machine-readable medium of example 22 wherein each tile is to include a high bandwidth memory (HBM) directly coupled thereto.

Example 24. The machine-readable medium of example 23 wherein, in accordance with the specified tile-based resource allocation policy, each tile is to be allocated at least one 3D graphics engine to perform 3D graphics processing and at least one compute engine to perform general purpose graphics processing operations.

Example 25. The machine-readable medium of example 22 wherein responsive to a first specified virtualization policy selected by a user, allocating at least one tile for continuous use by a virtual machine.

Example 26. The machine-readable medium of example 25 wherein responsive to a second specified virtualization policy selected by the user, sharing at least one tile among a first plurality of virtual machines in accordance with a first plurality of time quanta, each time quantum of the first plurality associated with at least one of the first plurality of virtual machines.

Example 27. The machine-readable medium of example 26 wherein responsive to a third specified virtualization policy selected by the user, allocating all tiles to each virtual machine in accordance with a second plurality of time quanta, each time quantum of the second plurality associated with at least one of the first plurality of virtual machines.

Example 28. The machine-readable medium of example 27 wherein each time quantum of the first and/or second plurality of time quanta are to be specified by the user within the second and/or third virtualization policies.

Example 29. The machine-readable medium of example 21 further comprising: scheduling operations from the plurality of virtual machines on the plurality of tiles in accordance with the tile-based resource allocation policy and the virtualization policy.

Example 30. The machine-readable medium of example 29 wherein scheduling is implemented with a plurality of schedulers, each scheduler allocated to at least one of the tiles.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processing apparatus comprising:
processing resources to process commands including graphics commands and generate results, the processing resources comprising one or more 3D graphics engines to perform 3D graphics processing and one or more compute engine to perform general purpose graphics processing operations;
resource partitioning circuitry to partition the processing resources into a plurality of tiles in accordance with a specified tile-based resource allocation policy, wherein in accordance with the specified tile-based resource allocation policy, each tile is allocated at least one 3D graphics engine and at least one compute engine; and
graphics virtualization circuitry to perform tile-based allocation of the processing resources to a plurality of virtual machines in accordance with a specified virtualization policy, the virtual machines to be executed in a virtualized execution environment.

2. The graphics processing apparatus of claim 1 wherein responsive to the specified tile-based resource allocation policy, the resource partitioning circuitry is to allocate an equal amount of the processing resources to each tile.

3. The graphics processing apparatus of claim 2 wherein the graphics virtualization circuitry is configurable by user selection of different virtualization policies, wherein responsive to a first specified virtualization policy, the graphics virtualization circuitry is to allocate at least one tile for continuous use by a virtual machine.

4. The graphics processing apparatus of claim 3 wherein responsive to a second specified virtualization policy, the graphics virtualization circuitry is to share at least one tile among a first plurality of virtual machines in accordance with a first plurality of time quanta, each time quantum of the first plurality associated with at least one of the first plurality of virtual machines.

5. The graphics processing apparatus of claim 4 wherein responsive to a third specified virtualization policy, the graphics virtualization circuitry is to allocate all tiles to each virtual machine in accordance with a second plurality of time quanta, each time quantum of the second plurality associated with at least one of the first plurality of virtual machines.

6. The graphics processing apparatus of claim 5 wherein each time quantum of the first and/or second plurality of time quanta are to be specified by a user within the second and/or third virtualization policies.

7. The graphics processing apparatus of claim 1 further comprising:
scheduling circuitry to schedule operations from the plurality of virtual machines on the plurality of tiles in accordance with the tile-based resource allocation policy and the virtualization policy.

8. The graphics processing apparatus of claim 7 wherein the scheduling circuitry comprises a plurality of schedulers, each scheduler allocated to at least one of the tiles.

9. A method comprising:
providing a specified tile-based resource allocation policy and a specified virtualization policy;
partitioning a set of processing resources into a plurality of tiles in accordance with the specified tile-based resource allocation policy, the processing resources operable to process commands including graphics commands and generate results and comprise one or more 3D graphics engines to perform 3D graphics processing and one or more compute engine to perform general purpose graphics processing operations, wherein in accordance with the specified tile-based resource allocation policy, each tile is allocated at least one 3D graphics engine and at least one compute engine;
executing a plurality of virtual machines in a virtualized execution environment; and
performing tile-based allocation of the processing resources to the plurality of virtual machines in accordance with a specified virtualization policy.

10. The method of claim 9 wherein responsive to the specified tile-based resource allocation policy, allocating an equal amount of the processing resources to each tile.

11. The method of claim 10 wherein responsive to a first specified virtualization policy selected by a user, allocating at least one tile for continuous use by a virtual machine.

12. The method of claim 11 wherein responsive to a second specified virtualization policy selected by the user, sharing at least one tile among a first plurality of virtual machines in accordance with a first plurality of time quanta, each time quantum of the first plurality associated with at least one of the first plurality of virtual machines.

13. The method of claim 12 wherein responsive to a third specified virtualization policy selected by the user, allocating all tiles to each virtual machine in accordance with a second plurality of time quanta, each time quantum of the second plurality associated with at least one of the first plurality of virtual machines.

14. The method of claim 13 wherein each time quantum of the first and/or second plurality of time quanta are to be specified by the user within the second and/or third virtualization policies.

15. The method of claim 9 further comprising:
scheduling operations from the plurality of virtual machines on the plurality of tiles in accordance with the tile-based resource allocation policy and the virtualization policy.

16. The method of claim 15 wherein scheduling is implemented with a plurality of schedulers, each scheduler allocated to at least one of the tiles.

17. A non-transitory machine-readable medium having program code stored thereon which, when executed by a machine, causes the machine to perform the operations of:
providing a specified tile-based resource allocation policy and a specified virtualization policy;
partitioning a set of processing resources into a plurality of tiles in accordance with the specified tile-based resource allocation policy, the processing resources operable to process commands including graphics commands and generate results and comprise one or more 3D graphics engines to perform 3D graphics processing and one or more compute engine to perform general purpose graphics processing operations, wherein in accordance with the specified tile-based resource allocation policy, each tile is allocated at least one 3D graphics engine and at least one compute engine;
executing a plurality of virtual machines in a virtualized execution environment; and
performing tile-based allocation of the processing resources to the plurality of virtual machines in accordance with a specified virtualization policy.

18. The non-transitory machine-readable medium of claim 17 wherein responsive to the specified tile-based resource allocation policy, allocating an equal amount of the processing resources to each tile.

19. The non-transitory machine-readable medium of claim 18 wherein responsive to a first specified virtualization policy selected by a user, allocating at least one tile for continuous use by a virtual machine.

20. The non-transitory machine-readable medium of claim 19 wherein responsive to a second specified virtualization policy selected by the user, sharing at least one tile among a first plurality of virtual machines in accordance with a first plurality of time quanta, each time quantum of the first plurality associated with at least one of the first plurality of virtual machines.

21. The non-transitory machine-readable medium of claim 20 wherein responsive to a third specified virtualization policy selected by the user, allocating all tiles to each virtual machine in accordance with a second plurality of time quanta, each time quantum of the second plurality associated with at least one of the first plurality of virtual machines.

22. The non-transitory machine-readable medium of claim 21 wherein each time quantum of the first and/or second plurality of time quanta are to be specified by the user within the second and/or third virtualization policies.

23. The non-transitory machine-readable medium of claim 17 further comprising:
scheduling operations from the plurality of virtual machines on the plurality of tiles in accordance with the tile-based resource allocation policy and the virtualization policy.

24. The non-transitory machine-readable medium of claim 23 wherein scheduling is implemented with a plurality of schedulers, each scheduler allocated to at least one of the tiles.

* * * * *